(12) United States Patent
Tasaka et al.

(10) Patent No.: US 8,135,064 B2
(45) Date of Patent: Mar. 13, 2012

(54) INTRA PREDICTION APPARATUS

(75) Inventors: Kei Tasaka, Ikoma (JP); Hiroshi Arakawa, Kashiba (JP); Takashi Masuno, Hirakata (JP); Koji Arimura, Hirakata (JP); Tatsuro Juri, Osaka (JP)

(73) Assignee: Panasonic Corporation, Osaka (JP)

( * ) Notice: Subject to any disclaimer, the term of this patent is extended or adjusted under 35 U.S.C. 154(b) by 1643 days.

(21) Appl. No.: 11/291,923

(22) Filed: Dec. 2, 2005

(65) Prior Publication Data

US 2006/0120456 A1  Jun. 8, 2006

(30) Foreign Application Priority Data

Dec. 3, 2004 (JP) ................... 2004-350928
Nov. 4, 2005 (JP) ................... 2005-321566

(51) Int. Cl.
*H04B 1/66* (2006.01)
*H04N 7/12* (2006.01)
*H04N 11/02* (2006.01)
*H04N 11/04* (2006.01)
*H04N 9/12* (2006.01)
*G06K 9/46* (2006.01)

(52) U.S. Cl. ......... 375/240.16; 375/240.08; 375/240.24; 375/240.26; 382/236; 348/392

(58) Field of Classification Search ............ 375/240.16, 375/240.26, 240.24, 240.08; 382/236; 348/392
See application file for complete search history.

(56) References Cited

U.S. PATENT DOCUMENTS

| 6,654,420 B1 * | 11/2003 | Snook ................. 375/240.16 |
| 6,859,559 B2 | 2/2005 | Boon et al. |
| 7,778,331 B2 * | 8/2010 | Sato et al. ............. 375/240.26 |
| 2003/0223645 A1 | 12/2003 | Sun et al. |
| 2004/0136458 A1 | 7/2004 | Dahlhoff et al. |

FOREIGN PATENT DOCUMENTS

JP  2004-304724  10/2004

OTHER PUBLICATIONS

"Advanced video coding for generic audiovisual services" H.264 Series H: Audiovisual and Multimedia Systems Infrastructure of audiovisual services—Coding of moving video.
Japanese Office Action issued in Japanese Patent Application No. JP 2005-321566 dated Jul. 20, 2010.

* cited by examiner

*Primary Examiner* — King Poon
*Assistant Examiner* — Neil R McLean
(74) *Attorney, Agent, or Firm* — McDermott Will & Emery LLP

(57) ABSTRACT

An intra prediction apparatus includes: a candidate narrowing-down unit which narrows down, from a plurality of intra prediction directions, an intra prediction direction candidate which is applied to a block of multiple pixels that constitutes a video in accordance with a characteristic of the video; and an intra prediction execution unit which executes intra prediction in the intra prediction direction narrowed down by said candidate narrowing-down unit. Through this, computational load can be lightened while contributing to improvement in picture quality and encoding efficiency.

24 Claims, 15 Drawing Sheets

FIG. 10
0 Vertical
1 Horizontal
2 DC
3 Diagonal-Down-Left
4 Diagonal-Down-Right
5 Vertical-Left
6 Horizontal-Up
7 Vertical-Right
8 Horizontal-Down
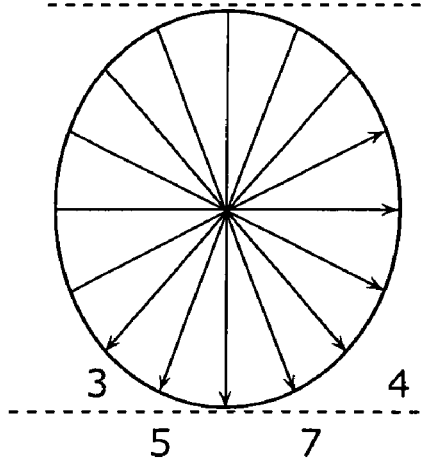
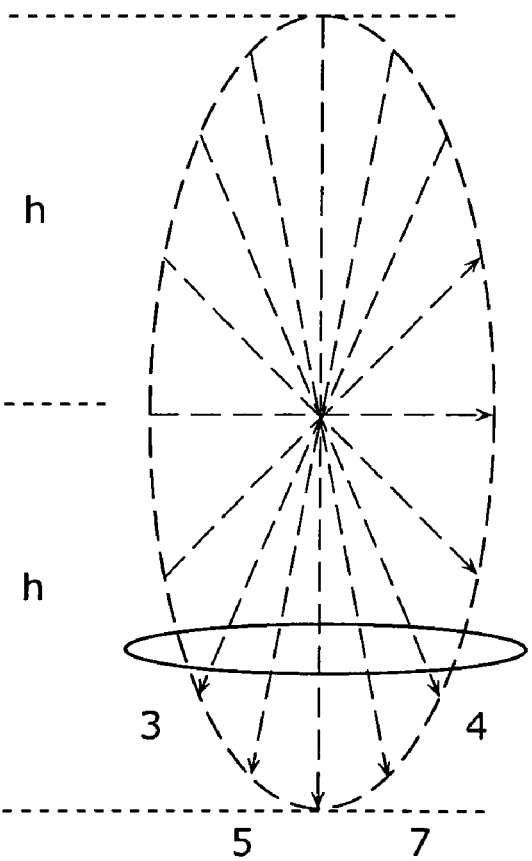
(a) Prediction Direction in Field
(b) Prediction Direction Corresponding to Original Picture

INTRA PREDICTION APPARATUS

BACKGROUND OF THE INVENTION

1. Field of the Invention

The present invention relates to an intra prediction apparatus used in moving picture compression and the like, and to technology for reducing an amount of computation for intra prediction which is one approach to moving picture compression.

2. Description of the Related Art

In recent years, through the spread of communication infrastructures such as broadband, and through the drop in cost of personal computers, high-volume recording apparatuses such as HDD and DVD, memory cards, and so on, an environment in which general consumers edit, store, transmit, and carry video has been established, and the number of users is expanding.

While situations in which general consumers handle video increase, there are also situations where personal computers do not have a level of performance that is sufficient for handling video, even in the present age of high-performance personal computers. For example, the information amount of video is extremely high, and it takes a significant amount of time to execute moving picture compression even when using a high-performance personal computer. Increasing the computational efficiency by processing using the same encoding performance but with a smaller computation amount can be considered as a solution to this. Additionally, the execution of highly efficient computation can be linked to a reduction in consumed power, and in a portable filming device, constraints placed on filming time by battery life can be relaxed. With this in mind, highly efficient moving picture compression technology is becoming more and more necessary.

Amid this, the newly-developed international moving picture compression standard H.264 (for example, see Non-Patent Reference Document 1, "H264 Advanced video coding for generic audiovisual services," Triceps) uses a plurality of moving picture compression tools with the aim of improving picture quality and encoding efficiency. Additionally, H.264 has a feature of sequentially comparing a plurality of prediction methods, selecting a prediction method with an advanced coding efficiency, and executing coding.

For example, in the case where coding is executed in a 16×16 pixel macroblock included in the Intra Coded Picture (I-picture) shown in FIG. 1, intra prediction is executed from a plurality of directions in each block of 4×4 pixels in the macroblock divided into 16 pixels, as well as being executed from a plurality of directions in the macroblock.

The 4×4 intra prediction, which is that representative example, selects the prediction method with the highest encoding efficiency by comparing a plurality of prediction methods.

In that prediction method, as shown in FIG. 2, there are 9 modes in all: a prediction mode 0 (vertical) in which a predicted pixel value is calculated from an above macroblock (MB) and the pixel value is predicted in a vertical direction; a prediction mode 1 (horizontal) in which a predicted pixel value is calculated from an adjacent MB and the pixel value is predicted in a horizontal direction; a prediction mode 8 (horizontal-up), a prediction mode 6 (horizontal down), and a prediction mode 4 (diagonal-down-right), in which a predicted pixel value is calculated from an adjacent MB and the pixel value is predicted respectively in a direction shifted ±22.5 degrees and −44.5 degrees from the horizontal; a prediction mode 5 (vertical right), a prediction mode 7 (vertical-left), and a prediction mode 3 (diagonal-down-left), in which a predicted pixel value is calculated from an adjacent MB and the pixel value is predicted in a direction shifted ±22.5 degrees and −44.5 degrees from the vertical; as well as a prediction mode 2 (DC) in which prediction is executed from an average in pixel values from adjacent MBs.

In the same manner, 16×16 intra prediction also has a plurality of prediction methods. In this 16×16 intra prediction, there are 4 modes of the same type of prediction method.

For 16×16 intra prediction, as shown in FIG. 3, there is a prediction mode 0 (vertical), a prediction mode 1 (horizontal), a prediction mode 2 (DC), and a prediction mode 3 (plane).

Because of this, as shown in FIG. 4, when an I-picture is inputted in a conventional intra prediction apparatus, a prediction error (absolute value difference sum) in the 9 paths of prediction modes in block 0 is calculated. In other words, in the 9 types of prediction modes, a differential value between a pixel to be encoded and a reference pixel, and an absolute value difference sum, are all calculated. Then, the intra prediction apparatus uses the mode with the lowest prediction error as the intra prediction.

When the intra prediction in block 0 finishes, the intra prediction apparatus repeats the same processing as mentioned above, and executes intra prediction in block 1 to block 15.

When the intra prediction in block 15 finishes, a differential value between a pixel to be encoded and a reference pixel, and an absolute value difference sum, are all calculated in the 4 types of prediction modes in that macroblock. Then, the intra prediction apparatus uses the mode with the lowest prediction error as the intra prediction; in other words, for example, the smaller of i) the total of the absolute value difference sum of each block and ii) the absolute value difference sum of the macroblock. That is to say, in the case where the total of the absolute value difference sum of each block is smaller, the intra prediction apparatus outputs a difference value for each block. On the other hand, in the case where the absolute value difference sum of the macroblock is smaller, the intra prediction apparatus outputs a difference value for the macroblock.

Data compression of the I-picture is executed in this manner.

However, as the abovementioned examples show, in a conventional intra prediction apparatus, overhead and computation load are large, because in the H.264 intra prediction that is the international standard moving picture compression format currently disclosed, a predictive picture is created through a plurality of prediction methods (9 types in 4×4 intra prediction, and 4 types in 16×16 intra prediction) for increasing picture quality, and an optimum prediction method is selected from a variety of prediction methods; in other words, because the processing with a high encoding efficiency is selected when executing encoding, an increase in the amount of encoding computation cannot be avoided while increasing picture quality and encoding efficiency.

Because of this, a reduction in the amount of encoding computation of H.264, which has advanced picture quality, is currently in demand in order to realize a moving picture compression technology with high picture quality and high efficiency.

SUMMARY OF THE INVENTION

Accordingly, an object of the present invention is to provide an intra prediction apparatus that can lighten the computational load while providing an increase in picture quality and coding efficiency.

To achieve the aforementioned object, the industrious research of the present inventor has resulted in that, in the case where a pixel of a generally adjacent macroblock (hereinafter, MB) is used and prediction is executed, a correlation between pixels becomes lower the greater the distance between the adjacent MB and the pixel becomes. The present inventor noted that in the case where intra prediction is executed using all prediction directions without considering the correlation between pixels, there are situations where intra prediction is executed using prediction directions which do not contribute to encoding efficiency, and wasteful processing occurs. Additionally, the present inventor noted a problem wherein unnecessary processing, such as processing of prediction directions which do not contribute to encoding efficiency, is executed when uniform intra prediction that is not adapted to the characteristics of the image and so on is executed.

In addition, the following problem exists in a method which systematically processes prediction direction in order to reduce intra prediction processing. For example, in 4×4 intra prediction, prediction in horizontal and vertical directions is evaluated first, and depending on the result, the next prediction direction to be evaluated is determined. The present inventor noted a problem in that in this method, even in the case where it is already known that prediction in the vertical direction will not contribute to encoding efficiency, one evaluation in the vertical direction is necessary, and an unnecessary prediction in the vertical direction is executed.

Through these observations, the present inventor arrived at the present invention.

To solve the abovementioned problems, an intra prediction apparatus according to the present invention includes: a candidate narrowing-down unit which narrows down, from a plurality of intra prediction directions, intra prediction direction candidates in accordance with a characteristic of video data, the intra prediction direction candidates to be applied to a block of multiple pixels that constitutes the video data; and an intra prediction execution unit which executes intra prediction using the intra prediction direction candidates narrowed down by said candidate narrowing-down unit.

In other words, at the time of intra prediction, the present invention omits, in advance, processing with poor encoding efficiency and processing with no difference in encoding efficiency, in accordance with the characteristics of the video.

Through this, computational load can be lightened while increasing the picture quality and encoding efficiency.

In addition, in the intra prediction apparatus according to the present invention, the candidate narrowing-down unit may narrow down the intra prediction direction candidates according to a pixel aspect ratio which is the characteristic of the video data.

In addition, in the intra prediction apparatus according to the present invention, the aspect ratio may be acquired from one of a video signal input device and information obtained from inside and outside of a video stream.

In addition, in the intra prediction apparatus according to the present invention, the candidate narrowing-down unit may narrow down the intra prediction direction candidates by using horizontal and vertical distances between adjacent pixels in an original picture as probabilities of prediction in horizontal and vertical directions, respectively, of intra prediction according to the pixel aspect ratio.

In addition, in the intra prediction apparatus according to the present invention, the candidate narrowing-down unit may narrow down the intra prediction direction candidates according to picture structure information which indicates one of an interlaced image and a progressive image and which is the characteristic of the video data.

In addition, in the intra prediction apparatus according to the present invention, the picture structure information may be acquired from one of a video signal input device and information obtained from inside and outside of a video stream.

In addition, in the intra prediction apparatus according to the present invention, the candidate narrowing-down unit may prioritize an elimination of vertical-right and a vertical-left directions included in the intra prediction directions as being candidates when the picture structure information indicates the interlaced image.

In addition, in the intra prediction apparatus according to the present invention, the candidate narrowing-down unit may prioritize an elimination of vertical-right, vertical-left, diagonal down-right, and diagonal down-left directions included in the intra prediction directions as being candidates when the picture structure information indicates the interlaced image.

In addition, in the intra prediction apparatus according to the present invention, the candidate narrowing-down unit may prioritize an elimination of a DC direction included in the intra prediction directions as being a candidates when the picture structure information indicates the interlaced image.

In addition, in the intra prediction apparatus according to the present invention, the candidate narrowing-down unit may prioritize an elimination of DC and vertical directions included in the intra prediction directions as being candidates when the picture structure information indicates the interlaced image.

In addition, in the intra prediction apparatus according to the present invention, when pictures are coded using a pict-level adaptive coding a moving picture compression standard, the candidate narrowing-down unit is operable to narrow down the intra prediction direction candidates according to picture structure information.

In addition, in the intra prediction apparatus according to the present invention, when the picture structure information is a field structure or frame structure and, when pictures are coded using a MB-level adaptive coding as a moving picture compression standard, the candidate narrowing-down unit may narrow down the intra prediction direction candidates according to information on whether a macroblock pair is the field structure or the frame structure when predicting by switching between a macroblock pair in the field structure and a macroblock pair in the frame structure.

In addition, in the intra prediction apparatus according to the present invention, the candidate narrowing-down unit may narrow down the intra prediction direction candidates based on a result obtained with respect to an original picture or an encoded picture preceding in an encoding order.

Through this, a candidate for the intra prediction direction can be narrowed down easily.

In addition, in the intra prediction apparatus according to the present invention, an original picture or an encoded picture before a current picture to be encoded may be used as the original picture or the encoded picture preceding in the encoding order.

Through this, correlation between the former original picture or encoded picture and the picture to be encoded becomes high, and a candidate for the intra prediction direction can be narrowed down accurately.

In addition, in the intra prediction apparatus according to the present invention, the result is a motion vector obtained from the encoded picture preceding in the encoding order, and the candidate narrowing-down unit may narrow down the intra prediction direction candidates based on a direction of the motion vector.

Through this, in the case where there is motion in the picture, a candidate of the intra prediction direction with a low correlation can be accurately and efficiently eliminated from an already-known motion vector.

In addition, in the intra prediction apparatus according to the present invention, wherein a motion vector in a unit area which is indicative of any of a spatially same position as a macroblock to be encoded, a position including surroundings of a spatially same position as a macroblock to be encoded, and an entire picture, may be used as the motion vector.

Through this, the precision of a movement vector for a macroblock to be encoded can be enhanced, and a candidate of the intra prediction direction with a low correlation can be accurately and efficiently eliminated from an already-known motion vector.

In addition, in the intra prediction apparatus according to the present invention, the result is an intra prediction direction obtained in an encoded picture preceding in the encoding order, and the candidate narrowing-down unit may narrow down the intra prediction direction candidates based on the intra prediction direction.

Through this, regardless of motion in a picture, a candidate of the intra prediction direction with a low correlation can be accurately and efficiently eliminated from an already-known motion vector.

In addition, in the intra prediction apparatus according to the present invention, an intra prediction direction of a macroblock to be encoded and a macroblock of a spatially identical position and a position including the surroundings of that spatially identical position may be used as the intra prediction direction.

Through this, the precision of a movement vector for a macroblock to be encoded can be enhanced, and a candidate of the intra prediction direction with a low correlation can be accurately and efficiently eliminated from that intra prediction direction.

In addition, in the intra prediction apparatus according to the present invention, the result is an adjacent pixel difference of the original picture or the encoded picture preceding in the encoding order, and the candidate narrowing-down unit may narrow down the intra prediction direction candidates based on the adjacent pixel difference.

Through this, in the case where there is little motion in a picture, a candidate of the intra prediction direction with a low correlation can be accurately and efficiently eliminated from an already-known pixel difference.

Note that the present invention can be realized not only by this kind of intra prediction apparatus, but also can be realized by an intra prediction method which makes steps of the characteristic units included in this kind of intra prediction apparatus, as well as by a program which causes a computer to execute those steps. It goes without saying that such a program may be distributed via a recording medium such as, for example, a CD-ROM Furthermore, it also goes without saying that the present invention can be realized as a picture encoding apparatus that includes the abovementioned intra prediction apparatus.

As has been made clear by the above descriptions, through the intra prediction apparatus in the present invention, computational load for intra prediction can be lightened while retaining high picture quality and encoding efficiency.

In other words, intra prediction is a processing which copies a pixel value from surrounding pixels and forms a predictive picture. However, because intra prediction selects a prediction mode with a high encoding efficiency using a plurality of prediction directions, computation of prediction directions which were not finally selected is redundant. Therefore, omission of prediction directions which do not contribute to encoding efficiency or do not produce much of a difference in encoding efficiency is valid from the viewpoint of reducing the amount of encoding computation. Additionally, with a field picture in interlace form, by not using a prediction direction that produces little difference in encoding efficiency, load occurring in intra prediction can be lightened. Additionally, by using features of a video, reduction of intra prediction processing in accordance to the video is possible, and processing efficiency becomes higher than conventional methods.

Therefore, the practical value of the present invention is extremely high in the present day, where video cameras, cellular phones with built-in cameras, and so on have spread extensively.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 10 is a diagram showing a difference in an angle between an original picture and a field in a 4×4 intra prediction;

In particular, FIG. 13(a) shows original pictures arranged in encoding order, FIG. 13(b) shows encoded pictures arranged in encoding order, and FIG. 13(c) shows a relationship between an encoded image ahead in an encoding order and a picture to be encoded;

In particular, FIG. 14(a) shows original pictures arranged in encoding order, FIG. 14(b) shows encoded pictures arranged in encoding order, and FIG. 14(c) shows a relationship between an encoded image ahead in an encoding order and a picture to be encoded.

DESCRIPTION OF THE PREFERRED EMBODIMENT(S)

An intra prediction apparatus according to the embodiment of the present invention is described hereafter with reference to the figures.

Figure 5:
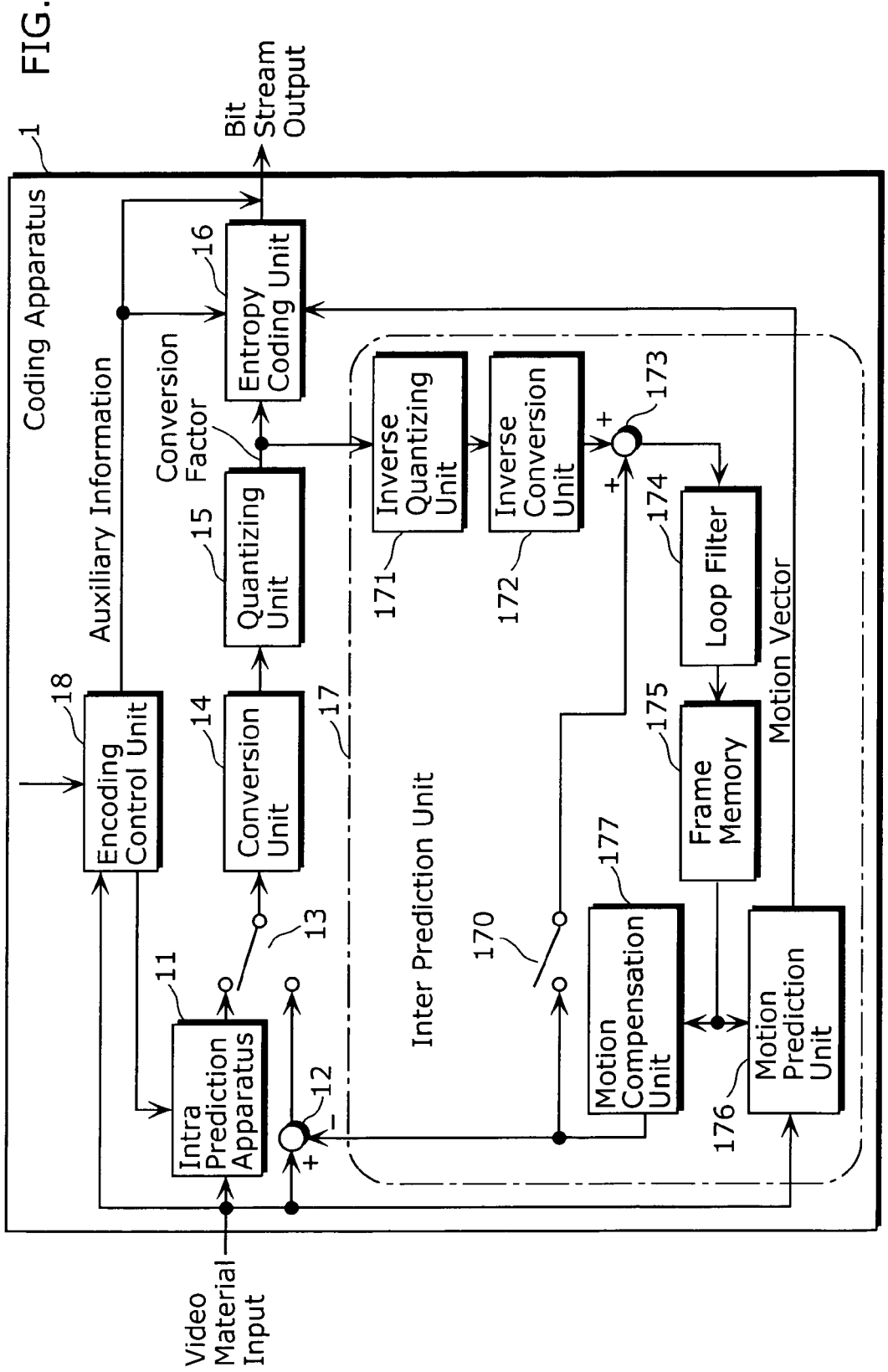
FIG. 5 is a function block diagram showing an overall configuration of a picture encoding apparatus 1 applied by an intra prediction apparatus according to an embodiment in the present invention.

FIG. 5 is a function block diagram showing an overall configuration of an encoding apparatus 1 applied in an intra prediction apparatus according to the embodiment in the present invention.

Figure 1:
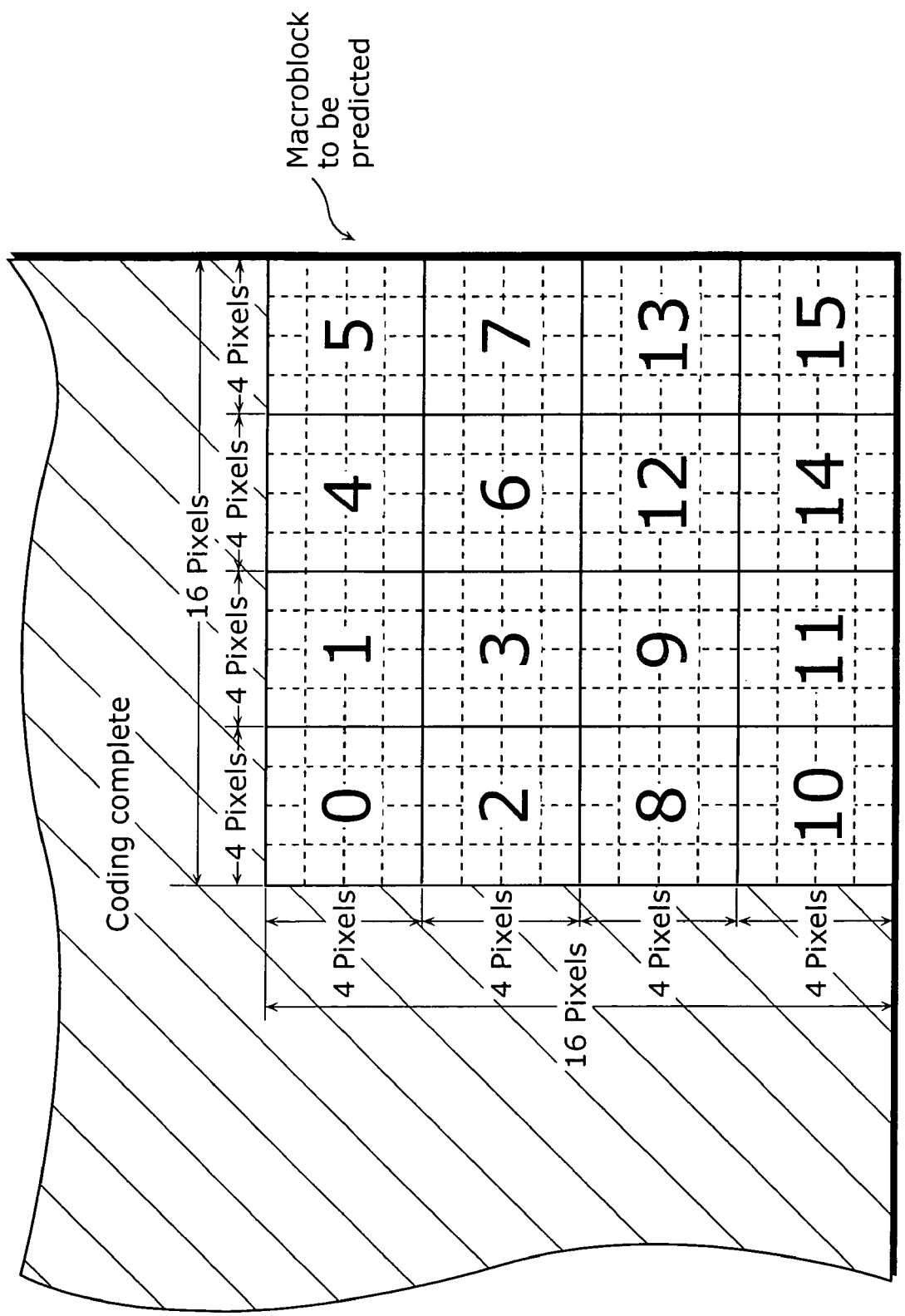
FIG. 1 is a diagram showing a relationship between a 16×16 pixel macroblock included in an I-picture and each 4×4 pixel block.

The encoding apparatus 1 is an apparatus that executes intra prediction encoding in an I-picture, inter encoding on a Predictive Coded Picture and a Bi-predictive Coded Picture, and the like, and as shown in FIG. 1, includes an intra prediction apparatus 11, a subtractor 12, a mode selector switch 13, a conversion unit 14, a quantizing unit 15, an entropy coding unit 16, an inter prediction unit 17, and a coding control unit 18. In addition, the inter prediction unit 17 includes a mode selector switch 170, an inverse quantizing unit 171, an inverse conversion unit 172, an adder 173, a loop filter 174, a frame memory 175, a motion prediction unit 176, and a motion compensation unit 177.

With regards to a picture on which inter encoding is executed, that picture to be encoded is divided into blocks, called macroblocks, of, for example, 16 horizontal pixels by 16 vertical pixels, and processing described below is executed on a per-block basis.

The picture to be encoded is caused to be converted into a differential image by obtaining a difference between a predictive picture signal that is an output of the movement compensation unit 177 in the subtractor 12. The differential image is outputted to the conversion unit 14 via the mode selector switch 13.

The conversion unit 14 converts the differential image from time base to frequency base, and by further quantizing in the quantizing unit 15, a residual signal made up of a conversion coefficient is generated.

This residual signal is locally decoded by the inter prediction unit 17. In other words, the residual signal is inversely quantized by the inverse quantizing unit 17. Then, the inverse conversion unit 172 executes picture decoding processing such as inverse frequency conversion, and generates a residual decoding signal. The adder 173 generates a reconstruction picture signal by adding the residual decoding signal and predictive picture signal. The reconstruction picture signal obtained is stored in the frame memory 175 after block distortion is removed by the loop filter 174.

On the other hand, an input picture signal of a macroblock unit read out from the frame memory 175 is inputted into the motion prediction unit 176. Here, one or a plurality of coded pictures stored in the frame memory 175 are search targets, and through detecting a picture area closest to the input picture signal, a motion vector indicating that position and a reference picture index indicating the picture selected at that time are determined. The detection of the motion vector is executed with block units of a further divided macroblock.

The movement prediction unit 176 uses the motion vector and reference picture index obtained to fetch an optimum picture area from a coded picture stored in the frame memory 175 and generates a predictive picture.

By executing variable-length coding in the entropy coding unit 16 on the encoding information of the motion vector, reference picture index, and residual encoding signal outputted through the above series of processing, a bit stream with a small amount of data is outputted through this encoding processing.

The above flow of processing is an operation in the case where inter picture prediction encoding is executed, but switching to intra prediction encoding can be executed through a switch 114 and a switch 115.

In the case where intra encoding is executed, generation of a predictive image through motion compensation is not executed, and in the intra prediction apparatus 11, a predictive image of an area to be encoded is generated from a coded area of inside the same picture, and by taking the difference a difference picture signal is generated. Note that details of this are given later. This difference picture signal is, in the same manner as the case of inter encoding, converted to a residual coding signal in the conversion unit 14 and the quantizing unit 15. The residual signal is variable-length coded by the entropy encoding unit 16, and a bit stream with a small amount of data is outputted.

Next, a detailed configuration of the intra prediction apparatus as shown in FIG. 5 is described.

Figure 6:
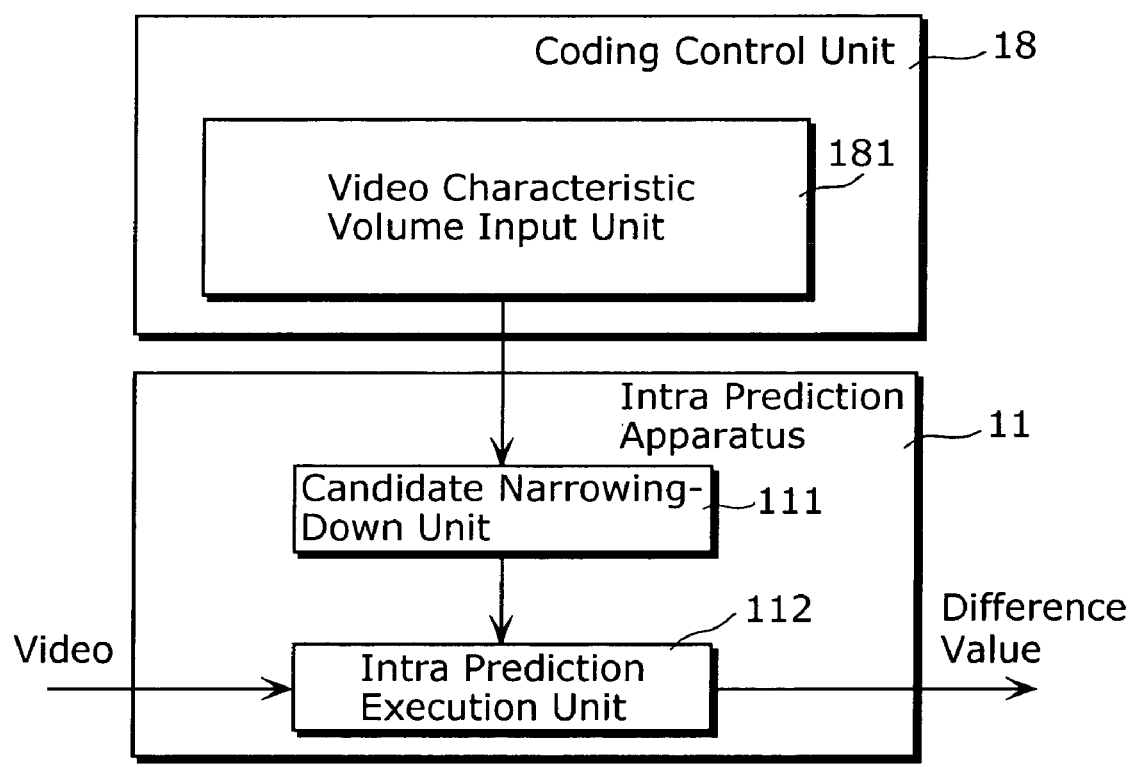
FIG. 6 is a block diagram showing a function configuration of an intra prediction apparatus 11 which uses a video characteristic volume.

FIG. 6 is a block diagram showing a function configuration of an intra prediction apparatus 11 which uses a video characteristic volume. Note that this diagram shows both the encoding control unit 18 and an included video characteristic volume input unit 181.

The video characteristic volume input unit 181 of the encoding control unit 18 acquires information attached to the inside and outside of a video stream, information held by a video input device, and so on, as a characteristic of a video, and outputs the acquired characteristic volume to the intra prediction apparatus 11.

The intra prediction apparatus 11 includes: a candidate narrowing-down unit 111, which narrows down candidates of an intra prediction direction applied per block of a plurality of pixels that make up a picture, from among a plurality including the characteristics of the video in question; and an intra prediction execution unit 112, which executes intra prediction in the intra prediction direction narrowed down by the candidate narrowing-down unit 111. Note that the intra prediction execution unit includes: a prediction error calculation unit, which calculates a reference pixel occurring in each prediction mode and a difference value of a pixel to be encoded, calculates an absolute value difference value, and so on; a conversion unit that has the same function as the conversion unit 14; a quantizing unit that has the same function as the quantizing unit 15; an inverse quantizing unit that has the same function as the inverse quantizing unit 171; an inverse conversion unit that has the same function as the inverse conversion unit 172; and an inverse prediction unit which reconstitutes a pixel value of a reconstituted picture from the pixel value and difference value of the reference pixel.

The candidate narrowing-down unit 111 first narrows down the candidate of the intra prediction direction from the characteristic volume from the picture characteristic volume input unit 181.

Next, the intra prediction execution unit 112 executes intra prediction in the intra prediction direction narrowed down by the candidate narrowing-down unit 111. In other words, prediction error is calculated, and the prediction mode with the smallest prediction error is used as the intra prediction.

Incidentally, in the intra prediction, there is a correlation between the characteristic volume and prediction precision of the intra prediction direction.

The prediction direction with a high prediction precision as predicted from the characteristic volume is used as a candidate for prediction direction, and by prioritizing an elimination of a prediction directions with a low prediction precision and prediction directions with no change in prediction precision, lightening the load of the intra prediction processing is possible. The characteristic volume mentioned here includes other external factors, such as a prediction mode obtained through computation for a pixel or video, properties held by video input device of an imaging element, and so on.

For example, a camera is panned during filming, causing it to swivel in a horizontal direction. This pan is detected by, for example, a gyro sensor set in the camera. Additionally, it is also acceptable to detect the pan from the motion vector of the previous and next pictures. When one frame of the video at the time of panning is taken out, a frame with a strong correlation between pixels in a sideways direction is formed. The prediction precision of the intra prediction direction can be estimated from the correlation between pixels, and intra prediction direction candidates with a low prediction precision can be reduced in advance.

In addition, in the case where the device is set to encode at a low bitrate, the case where encoding is performed at low resolution, and so on, in the case where a prediction mode close to the prediction direction, for example, prediction mode 0 (horizontal) and prediction mode 6 (horizontal-down) is used, there is a situation in which there is no big difference in the prediction error of both modes, and there is no difference in the encoding performance. Accordingly, prediction mode 0 (horizontal) and so on, in which the orientation of the prediction direction differs extensively, is preferentially the prediction candidate. In other words, prediction mode 6 is preferentially deleted.

Note that it is also acceptable to determine the prediction direction from the motion vector. In other words, when intra prediction is executed, the motion vector of a past or a future frame is used as the video characteristic volume. The possibility is high that a pixel value with a high correlation in the direction of that motion vector exists. Therefore, an intra prediction direction shifted extensively from the direction of that motion vector can be omitted. Here, the motion vector of the past or future frame can be a motion vector of the entire picture, or can be a motion vector of a specific area within the screen.

In addition, it is possible to omit, from the intra prediction direction candidates of an encoded MB, an intra prediction direction which is shifted extensively from the direction from a motion vector near an MB adjacent to the encoded MB.

Furthermore, in the encoded MB, when the motion vector is already requested, an intra prediction direction candidate with an even higher precision can be selected when that motion vector is a characteristic volume.

Incidentally, with H.264, only intra prediction is executed on the I-picture, and intra prediction/inter prediction are both executed on the P picture or the B picture, and encoding is executed with the encoding mode with the least residual signal. Because of this, intra prediction is executed in all pictures.

Using this, the prediction direction candidates of the picture to be encoded are restricted. In other words, the candidate narrowing-down unit 111 can narrow down the intra prediction direction candidates based on a result obtained in an original picture or an encoded picture ahead in encoding order. Through this, the intra prediction direction candidate can be narrowed down easily.

Specifically, first, the prediction direction of an intra prediction of a picture to be encoded first and a position of an MB within the picture are recorded into a memory. Next, the position of the MB within the picture recorded to the memory and the prediction direction are used, and intra prediction of the position of the same MB in the picture to be encoded is executed. For example, it is highly possible that, in the case where there is no motion in the entire picture, the prediction directions of intra prediction of MBs in a relative spatial position in consecutive pictures in display order are in the same direction. For example, it is highly possible that, in the case where encoding is executed in a structure of I, B1, B2, P . . . in display order, the prediction direction of an MB within the B1 picture is the same position as the encoding result of an MB in the same position in the I-picture or the P picture. Because of this, the prediction direction, which is the encoding result of the I-picture and the encoding result of the P picture, is the prediction direction candidate of the B1 picture. In the same manner, the candidate for the B2 picture is the intra prediction direction of the B1 picture and the P picture. In the case where inter prediction is chosen in both the B1 picture and the P picture, the prediction candidate of the B2 picture is 0, and it is possible that only inter prediction is executed.

Here, an MB of the same position within the picture is mentioned, but a prediction direction of an adjacent MB may also be included in the candidates. In other words, in the above example, the prediction direction of an MB to the top, bottom, left, and right may be a candidate as a prediction direction of the B2 picture, in addition to the MB of the same position in the B1 picture or the P picture.

Figure 7:
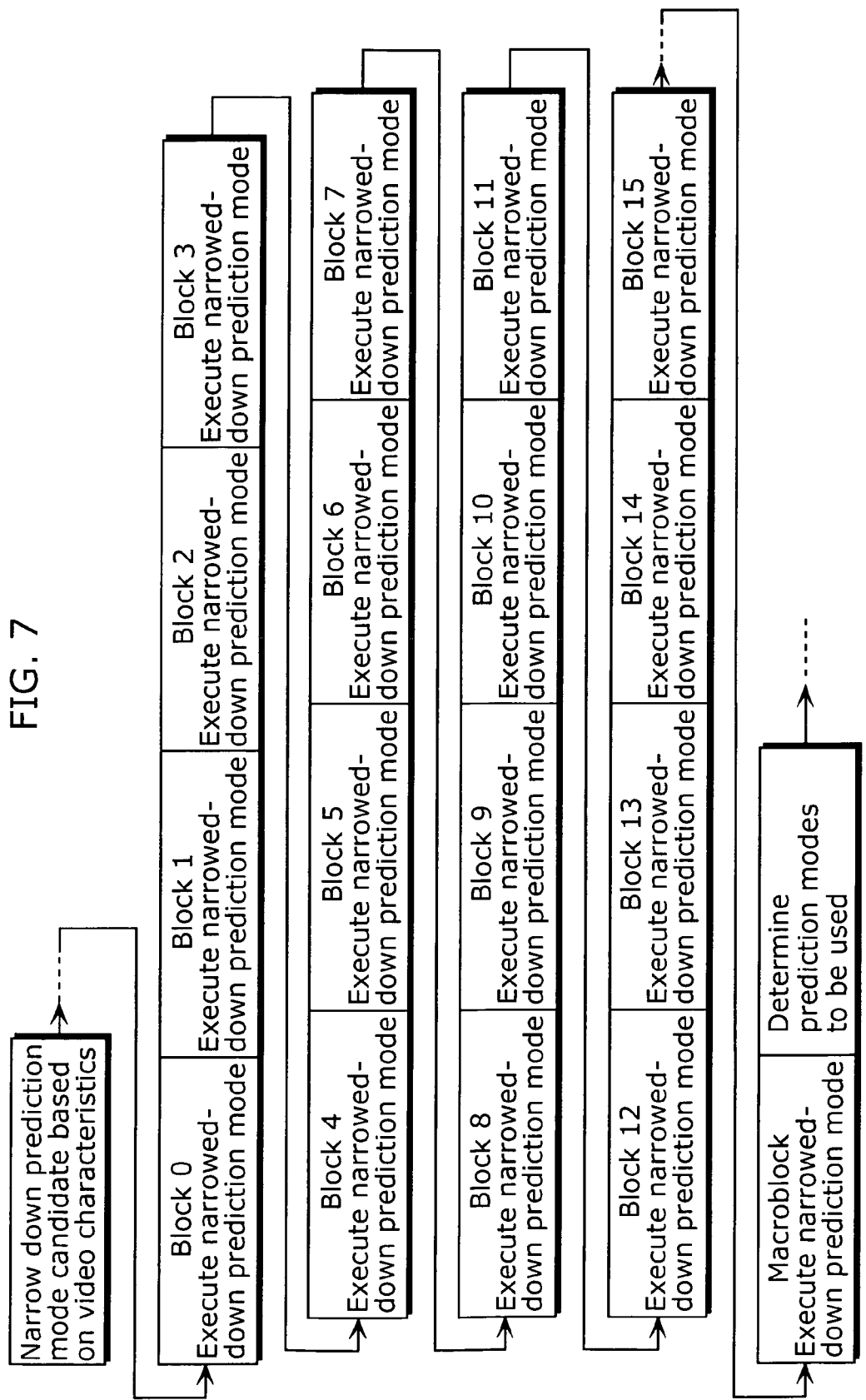
FIG. 7 is a sequence diagram showing a processing executed by each part of an intra prediction apparatus 11 in detail.

FIG. 7 is a sequence diagram showing a processing executed by each part of an intra prediction apparatus 11 in detail.

When an I-picture is inputted, the candidate narrowing-down unit 111 first narrows down the intra prediction direction candidates from the characteristic volume from the picture characteristic volume input unit 181. This narrowing-down can be applied to either of a block or a macroblock or both.

Next, the intra prediction execution unit 112 executes intra prediction on the intra prediction direction narrowed down by the candidate narrowing down unit 111. More specifically, the prediction error (absolute value difference sum) is calculated in the prediction mode narrowed down in block 0. In other words, the difference value and absolute value difference sum between the reference pixel and the pixel to be encoded is calculated only in the narrowed-down mode. Then, the intra prediction execution unit 112 uses the prediction mode with the smallest prediction error as the intra prediction. In other words, in the case when the prediction mode with the smallest absolute value difference sum is, for example, "1," the difference value between the reference pixel and the pixel to be encoded of block 0 in prediction mode 1 is converted, quantized, inverse-quantized, inverse-converted, and inverse-predicted, and through this, the pixel value of the reconstituted picture of block 0 is reconstituted from the difference value and the pixel value of the reference pixel.

When a pixel value of the decoded picture of block zero is decoded, the intra prediction execution unit 112 repeats the same processing as above, and decodes the pixel value of the decoded picture in blocks 1 to 15.

When the pixel value of the reconstituted picture in block 15 is reconstituted, the difference value and absolute value difference sum between the reference pixel and the pixel to be encoded is calculated only in the narrowed-down prediction mode in that macroblock. Then, the intra prediction execution unit 112 uses, as the intra prediction, the prediction mode with the smallest prediction error; in other words, for example, the smaller of the total of the absolute value difference sum of each block and the absolute value difference sum of the macroblock. That is to say, in the case where the total of the absolute value difference sum of each block is smaller, the intra prediction execution unit 112 outputs the difference value of each block. On the other hand, in the case where the absolute value difference sum of the macroblock is smaller, the intra prediction execution unit 112 outputs the difference value of the macroblock.

Therefore, it is possible to significantly lighten the load of the intra prediction execution unit 112, and increase the computational efficiency of the intra prediction by the amount the prediction mode is narrowed down.

Note that it is possible to realize this kind of intra prediction apparatus 11 not only as a hardware configuration but also as a CPU, a memory, a program, and so on.

Next, the case where the candidate is narrowed down in combination with the characteristic volume of the video is described in order.

First, the case where the characteristic volume of the video is the pixel aspect ratio is described.

Figure 8:
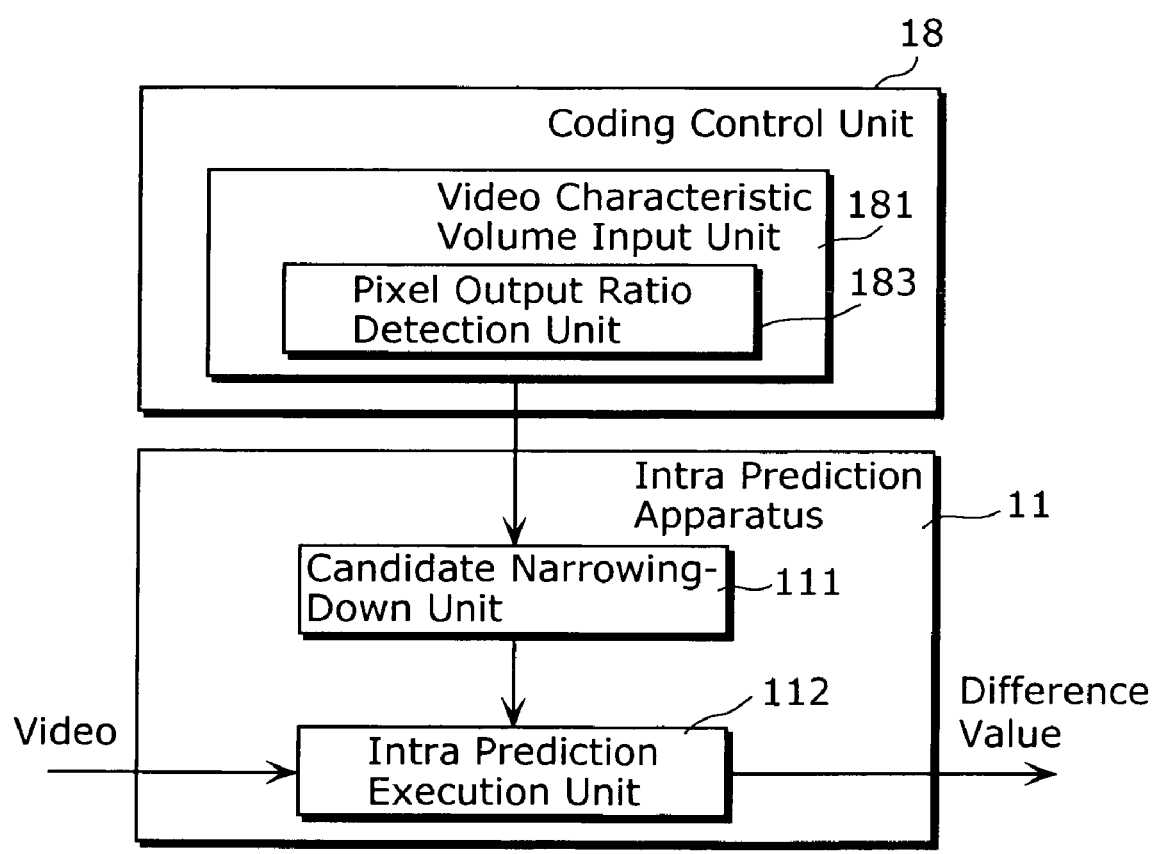
FIG. 8 is a block diagram showing a function configuration of an intra prediction apparatus 11 in the case where a picture structure is used.

FIG. 8 is a block diagram showing a function configuration of the intra prediction apparatus 11 which uses a pixel aspect ratio as the characteristic volume of the video. Note that a pixel aspect ratio detection unit 183, which is included in the picture characteristic volume input unit 181 of the encoding control unit 18, is also shown in this diagram. Additionally, the same numbers are assigned to the configuration parts corresponding to those in FIG. 6, and detailed descriptions of those parts are omitted.

Incidentally, with field structure, a picture in which every other horizontal pixel is recorded can be used. Because of this, a change occurs in a direction in the field and a direction in the original picture. In the same manner, when the pixel aspect ratio, which indicates the ratio of the horizontal and vertical distance between adjacent pixels, is caused to change, a change occurs in the direction in the original picture and a direction in the picture in which the pixel aspect ratio was caused to be changed. The pixel aspect ratio detection unit 183 detects this change. The computational efficiency of the intra prediction can be increased by narrowing down an appropriate prediction direction candidate in the candidate narrowing-down unit 111, in response to this change in the direction in the original picture through this pixel aspect ratio.

Figure 2:
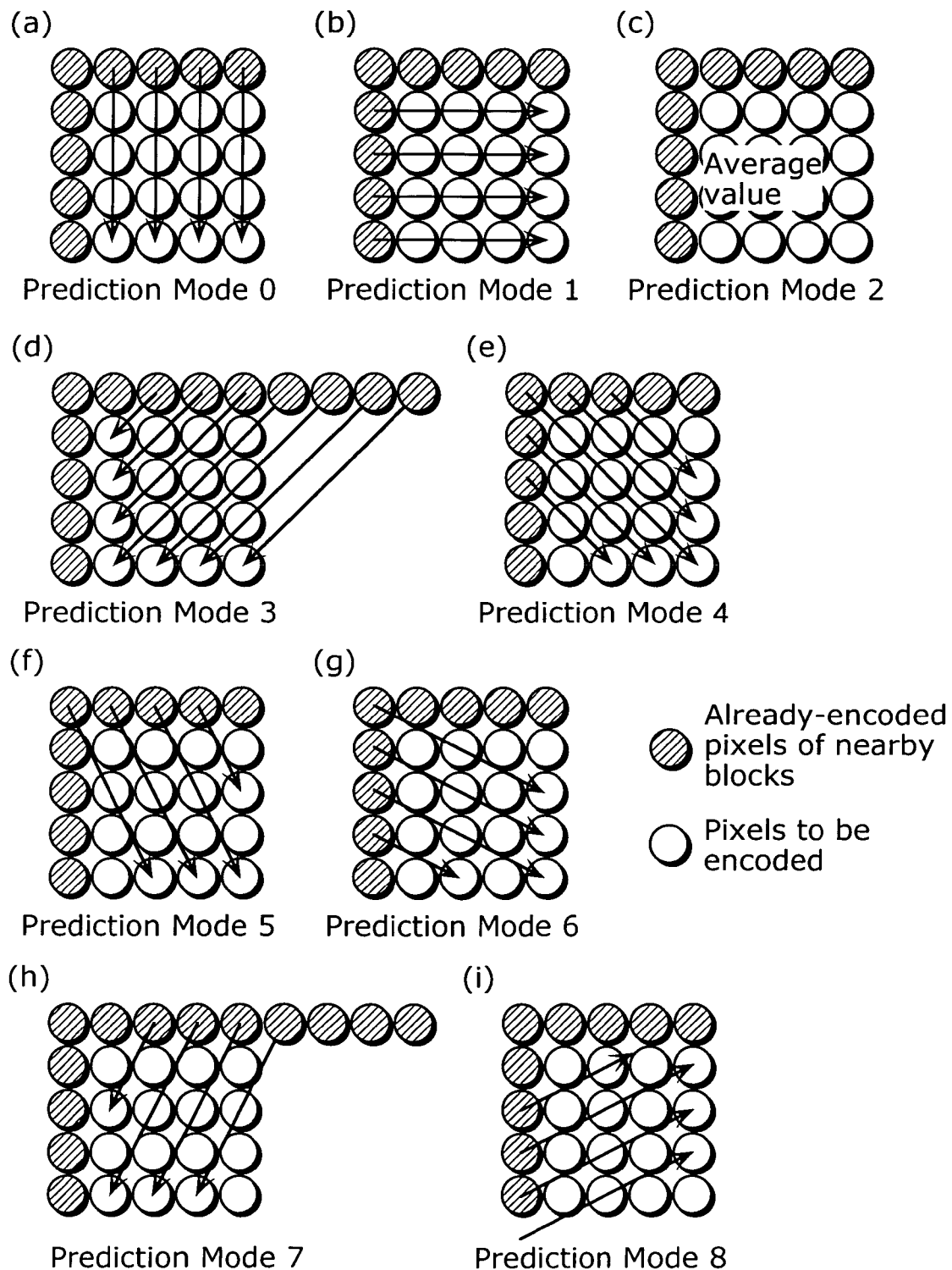
FIG. 2 is a diagram showing a 4×4 intra prediction direction.
Figure 3:
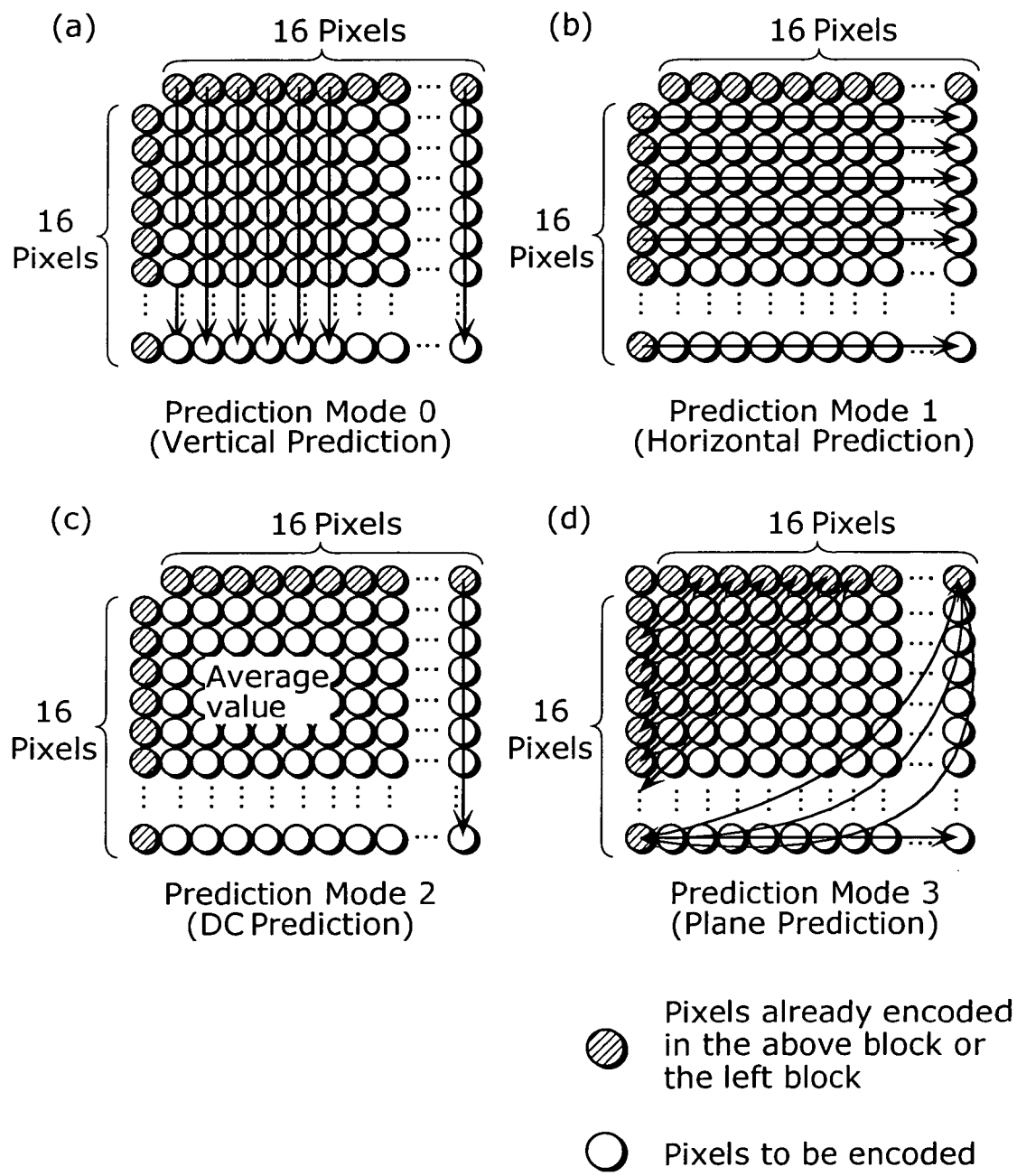
FIG. 3 is a diagram showing a 16×16 intra prediction diagram.
Figure 4:
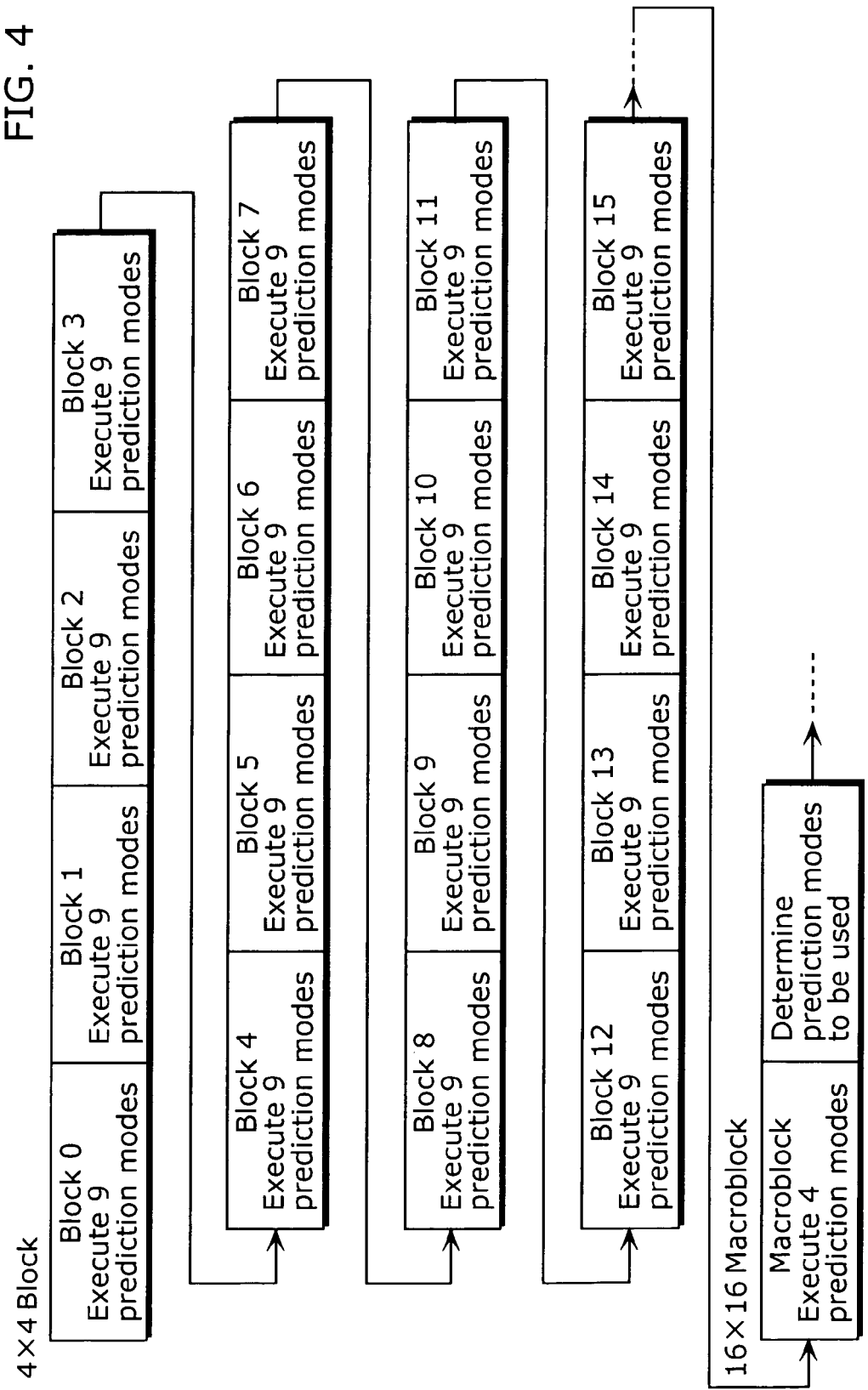
FIG. 4 is a sequence diagram showing a prediction processing executed by a conventional intra prediction apparatus.

A specific example of a case where the pixel aspect ratio is caused to change is described. A picture of half D1 has pixels in the horizontal direction thinned out, and therefore a change occurs between the direction in the half D1 and the direction in the original picture. Because of this, prediction directions that do not contribute to encoding efficiency, as in the case of the field structure, exist. Specifically, this is prediction mode 6 and prediction mode 8 shown in FIG. 2. When these are fixed to the direction in the original picture, they become close to the horizontal direction in prediction mode 0, and there is no difference in encoding efficiency. Therefore, computation processing can be lightened by omitting that prediction direction. Additionally, it is possible to increase the performance of all prediction directions by correcting the prediction direction of the intra prediction to a prediction direction according to the pixel aspect ratio.

Note that it is possible to realize this kind of intra prediction apparatus 11 as not only a hardware configuration but also as a CPU, a memory, a program, and so on.

In addition, in the intra prediction apparatus 11, the horizontal and vertical distance in the original picture can be used as a method to narrow down an appropriate prediction direction candidate, according to the pixel aspect ratio.

An inverse number of each of those distances is a probability of prediction. For example, in the field structure, the distance in the original picture is "1" for horizontal distance, and the vertical distance is double that, or "2." This being so, the probability is "1" and "½."

In this case, the probability of the vertical direction is greater than the probability of the horizontal direction, so the prediction result has a tendency to conform to this. Accordingly, a prediction mode close to the horizontal direction is preferentially employed as a candidate of prediction direction. In other words, by preferentially deleting the vertical direction or a prediction mode close to the vertical direction, the load can be lightened.

Note that it is possible to realize the items mentioned here not only as an apparatus but also as a program and so on.

In addition, information of the pixel aspect ratio is acquired from the filming device/recording device, and intra prediction is executed using that information.

For example, in the case where the imaging element of the filming device is not a square, a difference occurs between the vertical distance and the horizontal distance in the original picture.

Additionally, also in the case where the aspect ratio of the screen of the recording device is caused to be changed and recording is executed, a difference occurs between the vertical distance and the horizontal distance in the original picture.

In addition, intra prediction is executed with information attached inside and outside a video stream in an encoded standard, such as information obtained from an aspect_ratio_idc of a VUI parameter of H.264.

Note that it is possible to realize the items mentioned here not only as an apparatus but also as a program and so on.

Next, the case where the characteristic volume of the video is a picture structure is described.

Figure 9:
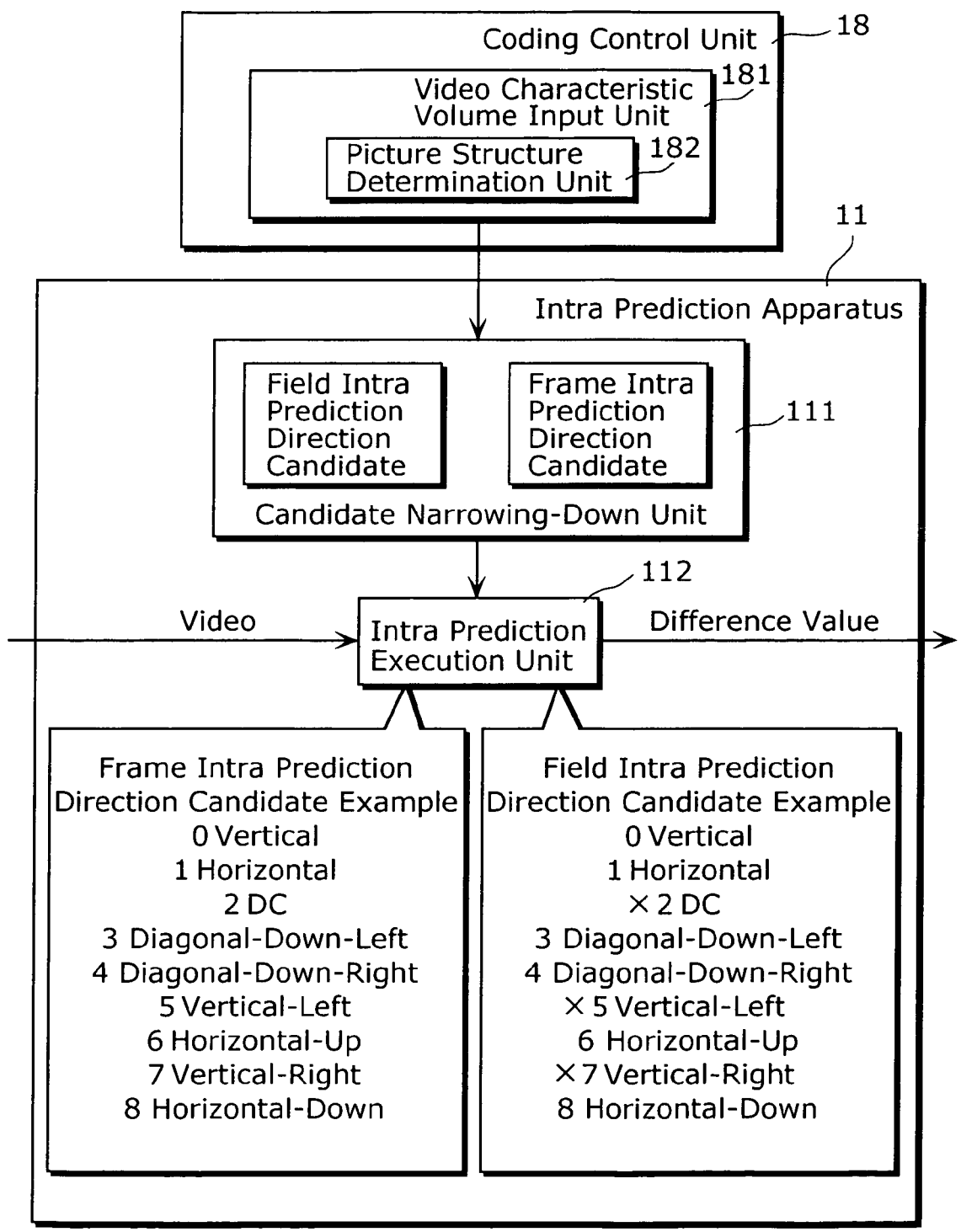
FIG. 9 is a block diagram showing a function configuration of an intra prediction apparatus 11 in the case where an aspect ratio is used.

FIG. 9 is a block diagram showing a function configuration of the intra prediction apparatus 11 which uses a picture configuration as the video characteristic volume. Note that a picture structure determination unit 182, which is included in the video characteristic volume input unit 181 of the encoding control unit 18, is also shown in this diagram. Additionally, the same numbers are assigned to the configuration parts corresponding to those in FIG. 6, and detailed descriptions of those parts are omitted.

Incidentally, a field picture in the interlace standard is configured of every other pixel of the original picture being thinned out in the vertical direction. Because of this, the continuity of pixels in the horizontal direction is no different than a frame picture in the progressive standard, but the continuity of the pixels in the vertical direction is low compared to the frame picture. The picture structure determination unit 182 determines the level of continuity.

Using this characteristic, the candidate narrowing-down unit 111 makes the prediction in the horizontal direction more selectable than the prediction in the vertical direction. In other words, prediction in the vertical direction (4×4 prediction mode 0, 16×16 prediction mode 0, and the like) is preferentially eliminated from the candidates.

Note that it is possible to realize the items mentioned here not only as an apparatus but also as a program and so on.

In addition, in the interlace standard, when a 4×4 intra prediction direction is translated to a direction in the original picture, a prediction mode exists in which no difference in the prediction direction occurs, as shown in FIG. 10.

As shown in FIG. 10, straight lines in 8 directions are drawn in a field picture in the interlace standard.

The field picture in the interlace standard is, as shown in FIG. 10(a), a picture constructed when pixels are thinned out on a per-line basis, and is in a state where the distance in the vertical direction is compressed at ½. On the other hand, when pixels replace this in an original position in the original picture, the vertical distance is twice the horizontal distance, with no thinning, as shown in FIG. 10(b). Because of this, in the original picture, the respective angles of the straight lines in 8 directions changes.

Of particular note are the directions prediction mode 5 (vertical-right) and prediction mode 7 (vertical-left). These directions become extremely close to the direction of prediction mode 0 (vertical).

Because of this, the pixel value predicted in the directions of prediction mode 5 (vertical-right), prediction mode 7 (vertical-left), and prediction mode 0 (vertical) in the 4×4 intra prediction are extremely close prediction modes, and little difference in the prediction error, which is the difference between the original picture, occurs. Similarly, the same trend appears in the directions of prediction mode 3 (diagonal-down-left) and prediction mode 4 (diagonal-down-right).

When these features are used to restrict the prediction candidates in advance, the intra prediction processing can be simplified without a drop in image quality.

In this case, the picture structure determination unit 182 determines whether the picture structure is a field picture in the interlace standard or a frame picture in the progressive standard, and outputs the determination result to the intra prediction apparatus 111.

The candidate narrowing-down unit 111 of the intra prediction apparatus 11 sends, as shown in FIG. 9, a field-use intra prediction candidate example, which has omitted several prediction candidates, to the intra prediction execution unit 112, when the picture is a field picture. The intra prediction execution unit 112 executes prediction computational processing on the narrowed-down intra prediction direction candidates, and determines the prediction direction.

Note that it is possible to realize the items mentioned here not only as an apparatus but also as a program and so on.

Furthermore, in the case where prediction is executed using pixels of a generally adjacent MB, the correlation between pixels becomes lower the further the distance from the adjacent MB.

Because of this, the possibility is high that prediction error increases the longer the distance between pixels in the original picture is.

In the case where there is a difference in horizontal distance and vertical distance, a difference occurs in the prediction error through the prediction directions of prediction mode 0 (vertical) and prediction mode 1 (horizontal) occurring in intra 16×16 prediction.

Figure 11:
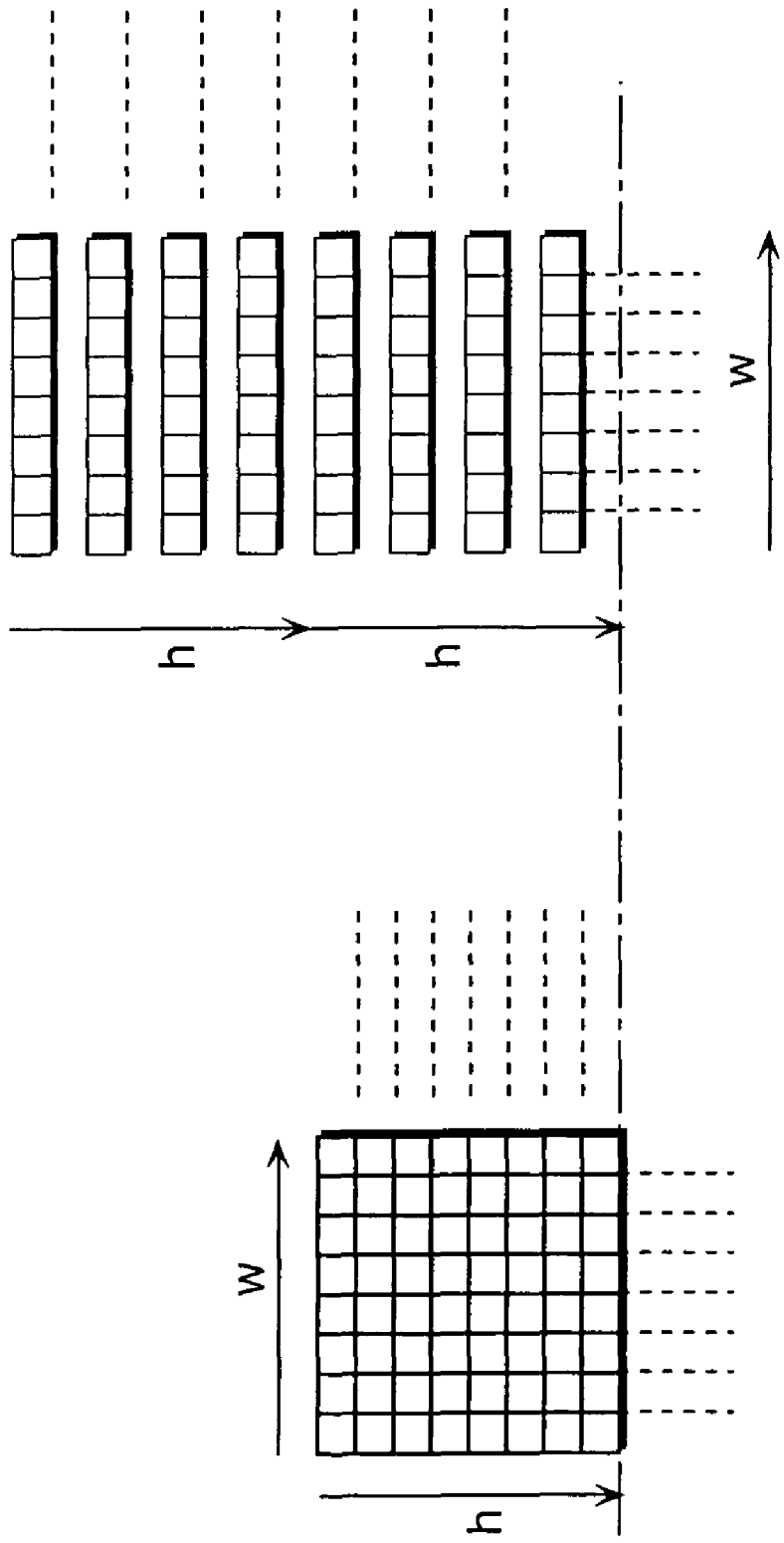
FIG. 11 is a diagram showing a distance relationship between a pixel location in a field and a pixel location in an original picture, in a 16×16 intra prediction.

As shown in FIG. 11, in the case where the picture structure is interlace, regarding the interval between pixels in the original picture, the vertical distance is twice the horizontal distance, the correlation of the pixels in vertical direction becomes low, and the prediction error becomes high.

In the field picture in the interlace standard, prediction mode 0 (vertical) prediction occurring in 16×16 intra prediction can be preferentially omitted.

In the same manner, in prediction mode 2 (DC) prediction, which predicts through an average of the value of a pixel furthest right in the adjacent MB on the right side and the value of a pixel furthest down in the adjacent MB above, because a pixel with a low correlation in the vertical is used in prediction pixel computation, prediction error becomes great, and prediction mode 2 (DC) in 16×16 intra prediction can be preferentially omitted.

Note that it is possible to realize the items mentioned here not only as an apparatus but also as a program and so on.

In addition, regarding the determination of whether the recording standard of the video is an interlace standard or progressive standard, the following case can be considered. Hereafter, the interlace standard and the progressive standard are called "recording standard" when recording and "reproduction standard" when reproducing.

There are cases in which the standard is selected by a user, and cases where the standard is determined by the specifications of the filming device, recording device, display device, and so on.

For example, in the case where the standard is selected by the user, in the case where the filming device accepts both the interlace standard and the progressive standard, the user selects a recording standard that conforms to a reproduction environment of the display device, reproduction device, and so on he/she is comfortable with. When a television, which is that display device, is in the interlace standard, a video camera, which is the filming device, selects the interlace standard when encoding, and it is possible to omit intra prediction directions which do not contribute to encoding efficiency.

For example, in the case where the standard is determined by the specifications of the filming device, when the filming device accepts only the interlace standard, encoding efficiency can be increased by omitting the intra prediction directions when filming in the interlace standard.

In addition, in the case where the standard is determined by the specifications of the recording device at the time when encoding is executed with a recording apparatus and the like from another video input device, when the input from the video device is judged to be the interlace standard at the time, encoding efficiency can be increased using the omission of the intra prediction direction.

The input from another video input device mentioned here is further described.

In the case where encoding is executed using another encoding standard, it is possible to differentiate whether or not the standard is the interlace standard through a rule based on that encoding standard. In other words, that differentiation is possible from header information and so on.

Furthermore, in the case where the standard is determined by the specifications of the display device, encoding efficiency can be increased through omitting the intra prediction directions at the time of recording in the interlace standard, in conformity with a reproduction standard of the display device connected to the display device.

Note that it is possible to realize the items mentioned here not only as an apparatus but also as a program and so on.

In addition, Pict-level-adaptive of the intra prediction in H.264 is a standard in which an intra prediction result in the frame structure and an intra prediction result in the field structure are compared per picture, and the one with better encoding performance is the prediction result. When predicting as that field structure, the candidate narrowing-down unit, which narrows down the intra prediction direction candidates by picture structure, is used.

It is already known that the picture structure determination unit 182 uses Pict-level-adaptive at the time of encoding, and therefore in the case where this standard is used, the candidate narrowing-down unit 111 can cause encoding by field structure, in other words, the prediction direction candidate at the time of encoding in the interlace standard, to be reduced.

In addition, MB-level-adaptive of the intra prediction in H.264 is a standard in which an intra prediction result in the frame structure and an intra prediction result in the field structure are compared per MB, and the one with better encoding performance is a prediction result. When predicting as that field structure, the candidate narrowing-down unit, which narrows down the intra prediction direction candidates by picture structure, is used. It is already known that the picture structure determination unit 182 uses MB-level-adaptive at the time of encoding, and therefore in the case where this standard is used, the candidate narrowing-down unit 111 can cause encoding by field structure, in other words, the prediction direction candidate at the time of encoding in the interlace standard, to be reduced.

Note that it is possible to realize the items mentioned here not only as an apparatus but also as a program and so on.

Next, the case where the characteristic volume of the video is a result obtained from the original picture or coded picture which is first in encoding order is described.

Figure 12:
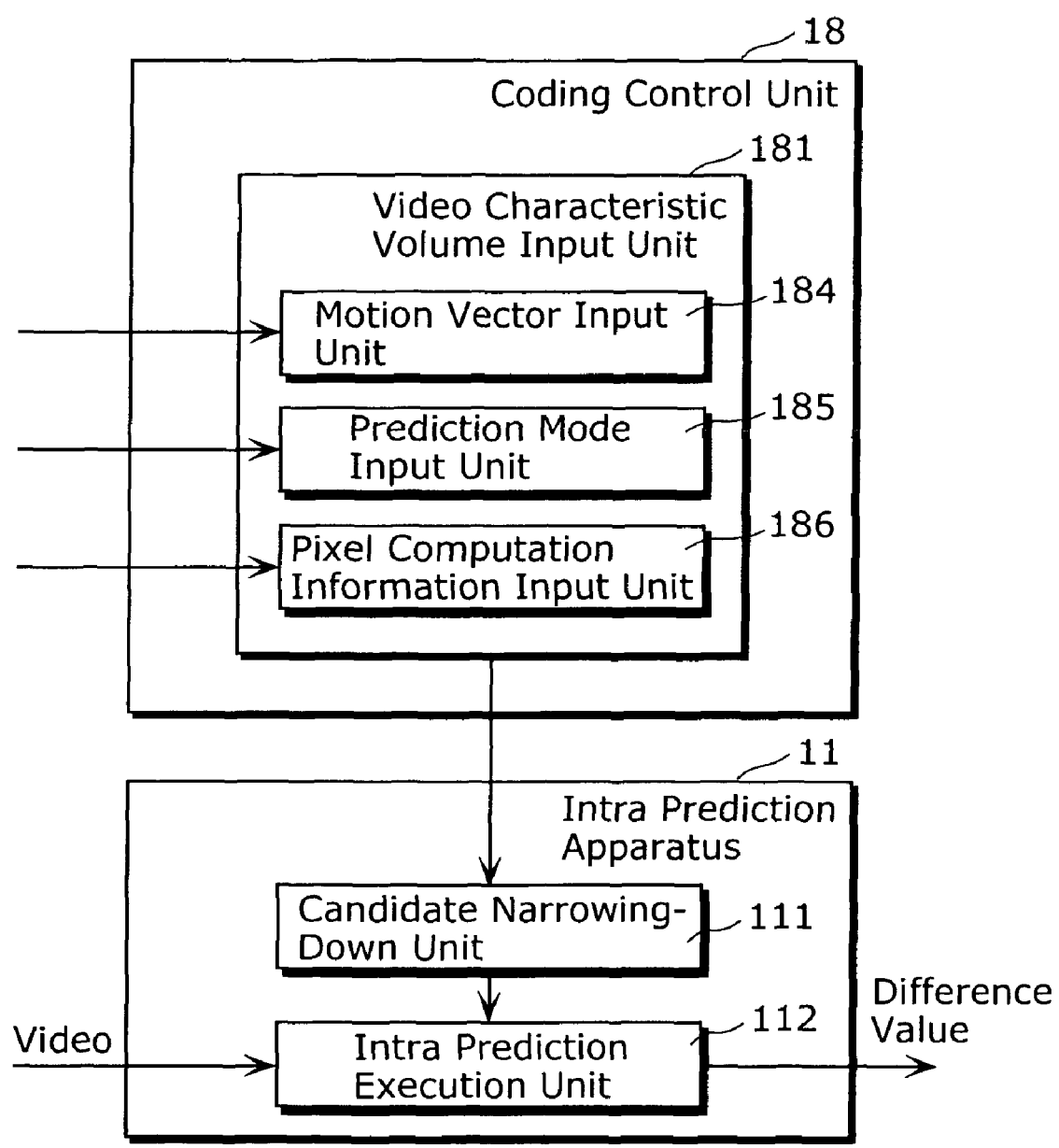
FIG. 12 is a block diagram showing a function configuration of an intra prediction apparatus 11 which uses a motion vector, prediction mode, and pixel computation information.

FIG. 12 is a block diagram showing a function configuration of the intra prediction apparatus 11 which uses a motion vector, a prediction mode, and pixel computation information as the abovementioned result. Note that a motion vector input unit 184, a prediction mode input unit 185, and a pixel computation information input unit 186, which are included in the picture characteristic volume input unit 181 of the encoding control unit 18, are also shown in this diagram. Additionally, the same numbers are assigned to the configuration parts corresponding to those in FIG. 6, and detailed descriptions of those parts are omitted.

Incidentally, as mentioned above, in H.264, only intra prediction is executed in an I-picture, and both intra prediction/inter prediction are executed in a Predictive picture (P-picture) or a Bi-predictive picture (B-picture), and encoding is executed in the encoding mode with the least residual signal.

Because of this, a result of an adjacent pixel difference, the direction of the intra prediction, and so on, for the encoded picture or original picture first in encoding order, are already known. Additionally, in the case where the encoded picture first in encoding order is a P-picture or a B-picture, the motion vector of each macroblock is already known. Moreover, there are many cases in which, through the characteristics of the video, the correlation between the original picture or encoded picture first in encoding order and the picture to be encoded is extremely high.

Therefore, processing with poor encoding efficiency and processing with no difference in encoding efficiency can be omitted in advance even if the intra prediction direction candidates are narrowed down using the result obtained in the original picture or encoded picture first in encoding order, or, in other words, the already-known motion vector, intra prediction, and adjacent pixel difference.

Accordingly, in this embodiment, as shown in FIG. 12, in the video characteristic volume input unit 181, there is the motion vector input unit 184, the prediction mode input unit 185, and the pixel computation information input unit 186, into which the motion vector, prediction mode, and adjacent pixel difference (also referred to as pixel computation information) that are the result obtained in the original picture or encoded picture first in encoding order, are inputted individually. The picture characteristic volume input unit 181 is configured so as to output the movement vector, prediction mode, and adjacent pixel difference selectively from the motion vector input unit 184, the prediction mode input unit 185, and the pixel computation information input unit 186, to the candidate narrowing-down unit 111.

Next, determination of a prediction direction candidate with the movement vector, as in the case where the movement vector is outputted from the movement vector input unit 184, is described.

Figure 13:
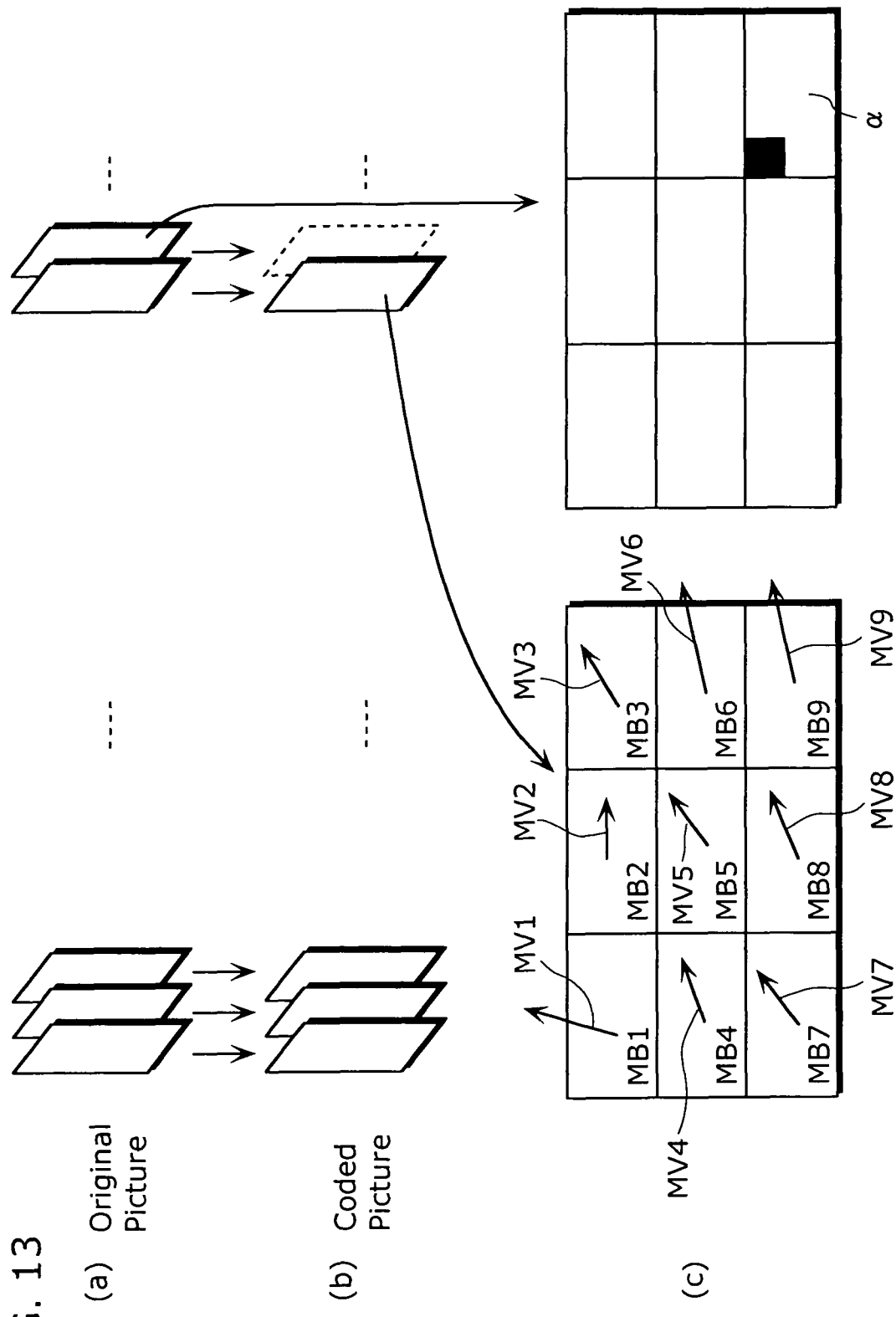
FIG. 13 is a diagram for describing determination of a prediction direction candidate by a motion vector.

FIG. 13 is a diagram for describing determination of a prediction direction candidate by the motion vector. In particular, FIG. 13(*a*) shows original pictures arranged in encoding order, FIG. 13(*b*) shows encoded pictures arranged in encoding order, and FIG. 13(*c*) shows a relationship between an encoded image ahead in an encoding order and a picture to be encoded.

Here, the case where the encoded picture which is the one previous to the picture to be encoded is used as the encoded picture first in encoding order, is described. This is because the correlation between the first original picture or encoded picture and the picture to be encoded is high, and the intra prediction direction candidate can be narrowed down with better precision.

This encoded picture is, as shown in the diagram, described as being configured of macroblocks MB1 to MB9, with the motion vectors of each macroblock MB1 to MB9 being MV1 to MV9. Additionally, the macroblock to be encoded is described as being α as indicated in the diagram.

In the case where intra prediction is executed in the macroblock α, the candidate narrowing-down unit 111, with the macroblock MB9 of the same spatial position as in the previous encoded picture used as a unit area, refers to the motion vector MV9 of that unit area, and based on the orientation of this motion vector MV9, narrows down the candidate of the intra prediction direction.

Specifically, there are many components in the horizontal direction of motion vector MV9, and extremely few vertically oriented components. In other words, the component in the horizontal direction of orientation of motion vector MV9 is dominant, and the correlation between the macroblock α to be encoded and the horizontal direction is high. Because of this, the candidate narrowing-down unit 111 considers the prediction direction in the vertical direction not to be a candidate, and removes the prediction direction. In other words, the candidate narrowing-down unit 111 omits modes 0, 5, and 7 from the motion vector MV9.

Therefore, in the case where there is movement in pictorial image, the precision of the motion vector for the macroblock to be encoded can be raised, and the intra prediction direction candidate with a low correlation from the already-known motion vector can be removed efficiently and with good precision.

Note that the periphery of this macroblock MB 9, in other words, the area including macroblock MB 5, MB 6, and MB 8, is considered the unit area, and the intra prediction direction candidate may be decided based on the orientation of the motion vector of this unit area. In other words, the intra prediction direction candidate may be narrowed down based on the orientation of the motion vector synthesized from motion vectors MV5, MV6, MV8, and MV9. In this case as well, because the orientation of the synthesized motion vector is a prediction mode which added the prediction mode found when each of the motion vectors MV5, MV6, MV8, and MV9 are broken down into the horizontal direction and vertical direction components, the horizontal direction component becomes dominant. Because of this, the candidate narrowing-down unit 111 can remove the prediction direction in the vertical direction as not being appropriate for a candidate. In other words, the candidate narrowing-down unit 111 omits the modes 0, 5, and 7 from the motion vectors MV5, MV6, MV8, and MV9.

In addition, it is also acceptable to decide the intra prediction candidate by referring to the particular direction the motion vector of the entire previous encoded picture is facing. In other words, it is acceptable to, with all of macroblocks MB1 to MB 9 considered to be a unit area, decide the intra prediction direction candidate based on the orientation of the motion vector of this unit area.

Next, determination of a prediction direction candidate through a prediction mode, in the case where the prediction mode is output by prediction mode input unit 185, is described.

Figure 14:
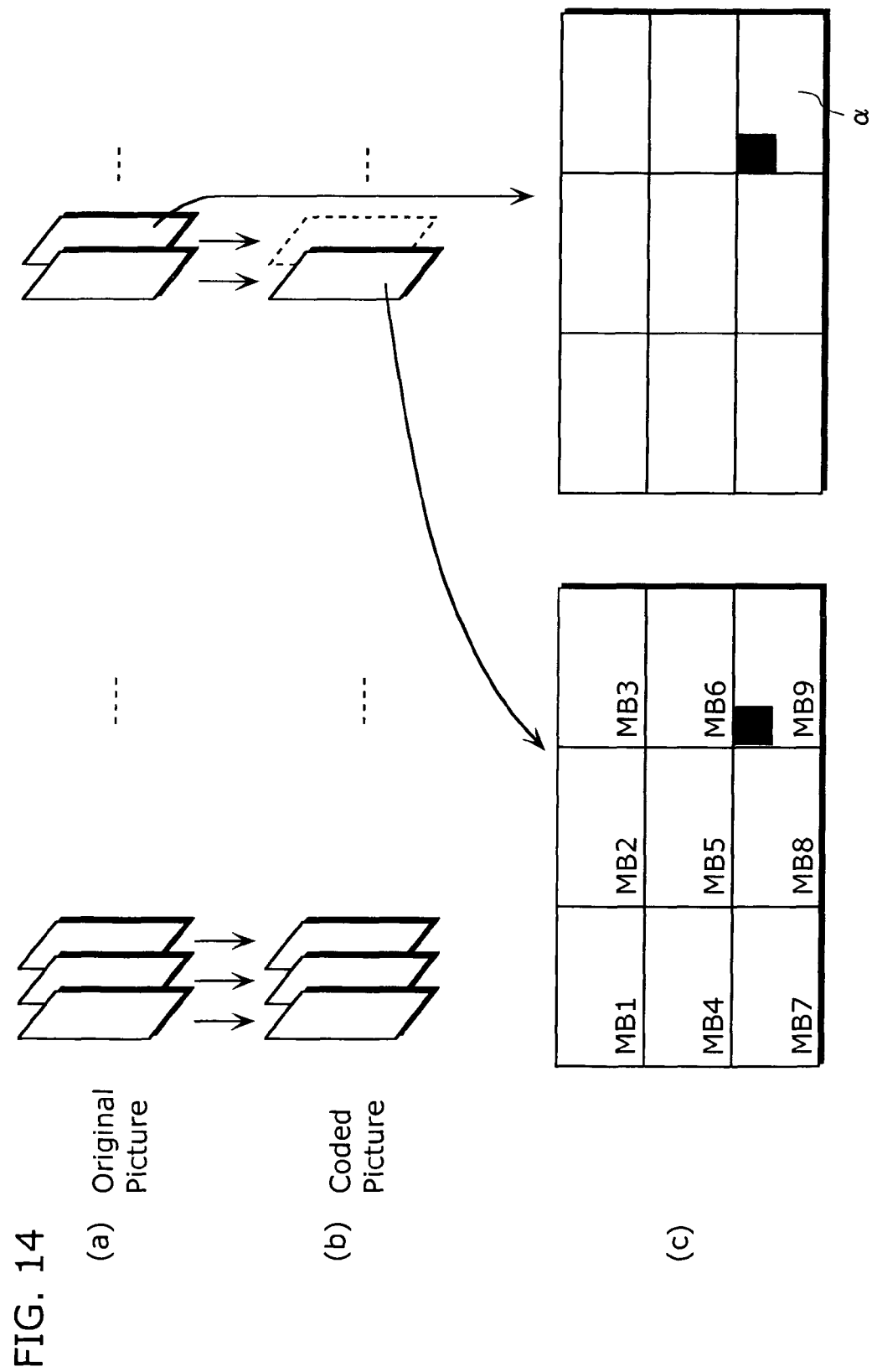
FIG. 14 is a diagram for describing determination of a prediction direction candidate by a prediction mode.

FIG. 14 is a diagram for describing the determination of a prediction direction candidate through a prediction mode. In particular, FIG. 14(*a*) shows original pictures arranged in encoding order, FIG. 14(*b*) shows encoded pictures arranged in encoding order, and FIG. 14(*c*) shows a relationship between an encoded image ahead in an encoding order and a picture to be encoded. Then, as shown in the diagram, this encoded picture is described being composed of the macroblocks MB1 to MB9. Additionally, the macroblock to be encoded is described as being α as indicated in the diagram.

Here, in the case where the encoded picture is an I-picture, the result of the prediction mode narrowed down in the macroblock employed in intra prediction remains. Therefore, in this case, the direction of the prediction mode narrowed down is used. On the other hand, in the case where the encoded picture is a P-picture or a B-picture, the result and prediction mode at the time of intra prediction are normally rejected. However, the configuration of the present embodiment is described as temporarily leaving the result and prediction mode at the time of intra prediction in the memory.

Figure 15:
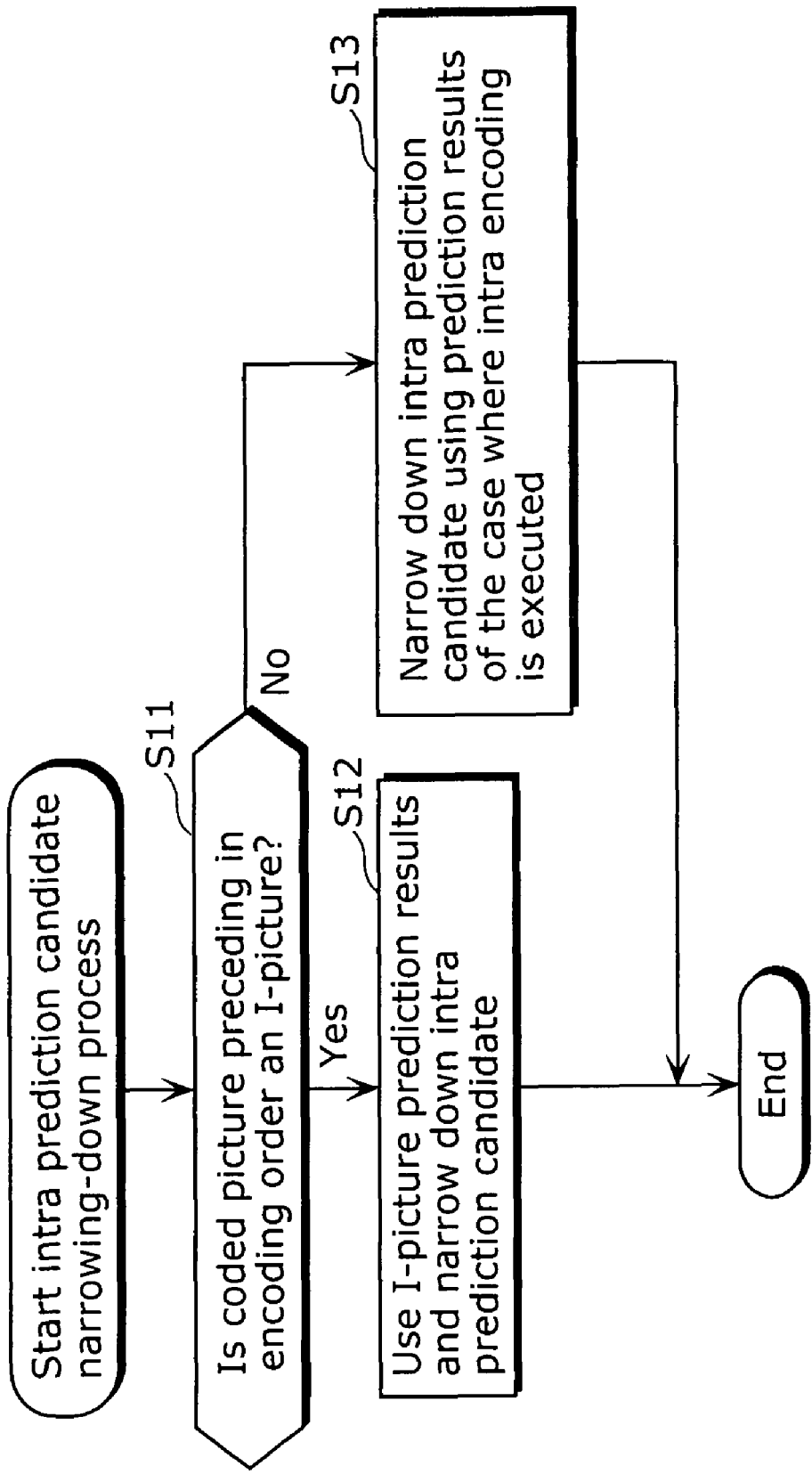
FIG. 15 is a flowchart showing an operation of an intra prediction candidate narrowing-down processing which narrows down an intra prediction candidate using intra prediction, which is an already-known result of a candidate narrowing-down unit 111.

FIG. 15 is a flowchart showing the operation of intra prediction candidate narrowing-down in which the candidate narrowing-down unit 11 uses an already known result and intra prediction to narrow down the intra prediction candidate.

In the case where intra prediction is executed on the macroblock α, the candidate narrowing-down unit 111 first judges whether or not the encoded picture referred to as being first in encoding order is an I-picture (S11). Note that the encoded picture previous to the picture to be encoded is used as the encoded picture first in encoding order. This is because the correlation between the previous original picture or encoded picture and the picture to be encoded increases, and the intra prediction direction candidate can be narrowed down with higher precision.

Regarding the judgment result, in the case where the picture is an I-picture (yes of S11), the candidate narrowing-down unit 111 uses the prediction result of the I-picture to narrow down the intra prediction direction candidate (S12), and the intra prediction direction narrowing-down processing ends. In other words, the candidate narrowing-down unit 111 considers the macroblock MB9 of the same spatial position as the previous encoded picture as the unit area, refers to the direction of the intra prediction mode of that unit area, and, in the macroblock employed in that intra prediction, narrows down the intra prediction direction candidate based on the orientation of the direction of the narrowed-down prediction mode. Specifically, when the direction of the narrowed-down prediction mode is, for example, in horizontal direction, it is very probable that the intra prediction direction of the macroblock a to be encoded is the horizontal direction. Because of this, the candidate narrowing-down unit 111 eliminates the prediction direction in the vertical direction from being a candidate.

Therefore, excluding the case where there is movement in the picture, in the case where there is little movement in the picture, it is possible to increase the precision of the direction for the macroblock to be encoded, and the intra prediction direction candidate with a low correlation from the direction of the already-known prediction mode can be removed efficiently and with high precision.

Note that the circumference of this macroblock MB 9, in other words, an area including macroblock MB 5, MB 6, and MB 8, is considered a unit area, and the intra prediction direction candidate may be decided based on the orientation of the motion vector of this unit area.

On the other hand, in the case where the picture is not an I-picture (No of S11), the candidate narrowing-down unit 111 uses the prediction result of the case where intra encoding is executed, and narrows down the intra prediction candidate (S113), and the inter prediction candidate narrowing-down processing ends.

Therefore, even in the case where the encoded picture first in encoding order is not an I-picture, the intra prediction direction candidate with a low correlation from the already-known intra prediction direction can be removed efficiently, easily, and with high precision, regardless of movement in the picture.

Next, determination of the prediction direction candidate through the pixel computation information occurring in the case where the adjacent pixel difference, in other words, the pixel computation information, is outputted from the pixel computation information unit 186, is described.

Here, pixel computation information means either 1) an adjacent difference of a pixel in the original picture first in encoding order which is included in the video characteristics or 2) the adjacent pixel difference of an encoded picture. This kind of pixel computation information is already calculated during intra prediction, and thus is calculated beforehand and is already known.

Therefore, the pixel computation information is configured to lighten the load of the candidate narrowing-down unit 11 by temporarily leaving this result in the memory and re-using and re-calculating the result. Note that here, the configuration is explained as temporarily leaving the result at the time of intra prediction and the pixel computation information in the memory.

The candidate narrowing-down unit 111 narrows down the intra prediction candidate according to 1) the adjacent difference of a pixel in the original picture first in encoding order which is included in the video characteristics or 2) the adjacent pixel difference of an encoded picture. Note that the original picture or encoded picture previous to the picture to be encoded is used as the original picture or encoded picture next in encoding order. This is because the correlation between the next original picture or encoded picture and the picture to be encoded becomes high, and the intra prediction direction candidate can be narrowed down with higher precision.

Then, the candidate narrowing-down unit 111 considers the macroblock of the same spatial position as the previous original picture or encoded picture as the unit area, refers to the pixel computation information of that unit area, and, in the macroblock of the picture to be encoded, narrows down the intra prediction direction candidate based on the pixel computation information of the macroblock employed in this intra prediction. Specifically, the intra prediction candidate is narrowed down according to a comparison between the adjacent pixel difference in the horizontal direction in that unit area and a vertical component adjacent pixel difference. Through this, it is possible to know which of the horizontal direction and vertical direction has a high correlation; in other words, an orientation with a high correlation. Therefore, in the case where there is little movement in the picture, the intra prediction direction candidate with a low correlation from the already-known pixel computation information can be removed efficiently and with high precision.

In each of the exemplary embodiments discussed above, the candidate narrowing-down unit is operable to adjust an amount of the narrowing down of the intra prediction direction candidates based on factors which are different than the characteristic of the video data. For example, the candidate narrowing-down unit is operable to adjust the amount of the narrowing down of the intra prediction direction candidates based on a processing capacity of the intra prediction apparatus.

Note that it is possible to realize the items mentioned here not only as an apparatus but also as a program and so on.

Also note that the above embodiment describes the case where the video is a moving picture, but it is also acceptable to apply the intra prediction according to the present invention to a still picture such as a JPEG to further compress encoded data, as long as the target of intra-prediction is an I-picture.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

Industrial Applicability

Using the intra prediction apparatus according to the present invention, it is possible to realize the video encoding according to H.264 with less computational load. The intra prediction apparatus can be applied to a personal computer, an HDD recorder, a DVD recorder, a video camera, a cellular phone with a built-in camera, and so on.

In addition, the encoding apparatus included in this intra prediction apparatus can also be applied.

What is claimed is:

1. An intra prediction apparatus comprising:
an acquiring unit configured to acquire information identifying a display form of a plurality of pixels that makes up input video data, the display form being used for displaying the plurality of pixels as a picture;
a candidate narrowing-down unit configured to narrow down, from a plurality of intra prediction directions, intra prediction direction candidates based on the information acquired by the acquiring unit, the intra prediction direction candidates being applied to a block composed of the plurality of pixels; and
an intra prediction execution unit configured to execute intra prediction on the block using the intra prediction direction candidates narrowed down by said candidate narrowing-down unit,
wherein a combination of the intra prediction direction candidates narrowed down by said candidate narrowing-down unit changes depending on horizontal and vertical distribution of the plurality of pixels as indicated by the information acquired by the acquiring unit,
(a) a majority of the intra prediction directions included in the narrowed-down intra prediction direction candidates each have more vertically oriented components than horizontally oriented components when a comparison between the vertical distribution and the horizontal distribution of the plurality of pixels shows that density of the vertical distribution is higher than density of the horizontal distribution, and
(b) a majority of the intra prediction directions included in the narrowed-down intra prediction direction candidates each have more horizontally oriented components than vertically oriented components when a comparison between the vertical distribution and the horizontal distribution of the plurality of pixels shows that density of the horizontal distribution is higher than density of the vertical distribution.

2. The intra prediction apparatus according to claim 1, wherein the information acquired by the acquiring unit includes a pixel aspect ratio.

3. The intra prediction apparatus according to claim 2, wherein the aspect ratio is acquired from one of a video signal input device and information obtained from inside and outside of a video stream.

4. The intra prediction device according to claim 2, wherein the information acquired by the acquiring unit includes horizontal and vertical distances between adjacent pixels in an original picture as probabilities of prediction in horizontal and vertical directions, respectively, of intra prediction according to the pixel aspect ratio.

5. The intra prediction apparatus according to claim 1, wherein the information acquired by the acquiring unit includes picture structure information which indicates one of an interlaced image and a progressive image and which is the characteristic of the video data.

6. The intra prediction apparatus according to claim 5, wherein the picture structure information is acquired from one of a video signal input device and information obtained from inside and outside of a video stream.

7. The intra prediction apparatus according to claim 5, wherein said candidate narrowing-down unit is configured to prioritize an elimination of vertical-right and vertical-left directions included in the intra prediction directions as being candidates when the picture structure information indicates the interlaced image.

8. The intra prediction apparatus according to claim 5, wherein said candidate narrowing-down unit is configured to prioritize an elimination of vertical-right, vertical-left, diagonal down-right, and diagonal down-left directions included in the intra prediction directions as being candidates when the picture structure information indicates the interlaced image.

9. The intra prediction apparatus according to claim 5, wherein said candidate narrowing-down unit is configured to prioritize an elimination of a DC direction included in the intra prediction directions as being a candidates when the picture structure information indicates the interlaced image.

10. The intra prediction apparatus according to claim 5, wherein said candidate narrowing-down unit is configured to prioritize an elimination of DC and vertical directions included in the intra prediction directions as being candidates when the picture structure information indicates the interlaced image.

11. The intra prediction apparatus according to claim 5, wherein, when pictures are coded using a pict-level adaptive coding as a moving picture compression standard, said candidate narrowing-down unit is configured to narrow down the intra prediction direction candidates according to picture structure information.

12. The intra prediction apparatus according to claim 5, wherein the picture structure information is a field structure or frame structure and, when pictures are coded using a MB-level adaptive coding as a moving picture compression standard, said candidate narrowing-down unit is configured to narrow down the intra prediction direction candidates according to information on whether a macroblock pair is the field structure or the frame structure when predicting by switching between a macroblock pair in the field structure and a macroblock pair in the frame structure.

13. The intra prediction apparatus according to claim 1, wherein said candidate narrowing-down unit is configured to narrow down the intra prediction direction candidates based on a result obtained with respect to an original picture or an encoded picture preceding in an encoding order.

14. The intra prediction apparatus according to claim 13, wherein an original picture or an encoded picture before a current picture to be encoded is used as the original picture or the encoded picture preceding in the encoding order.

15. The intra prediction apparatus according to claim 13, wherein the result is a motion vector obtained from the encoded picture preceding in the encoding order; and said candidate narrowing-down unit is configured to narrow down the intra prediction direction candidates based on a direction of the motion vector.

16. The intra prediction apparatus according to claim 15, wherein a motion vector in a unit area which is indicative of any of a spatially same position as a macroblock to be encoded, a position including surroundings of a spatially same position as a macroblock to be encoded, and an entire picture, is used as the motion vector.

17. The intra prediction apparatus according to claim 13, wherein the result is an intra prediction direction obtained in an encoded picture preceding in the encoding order; and said candidate narrowing-down unit is configured to narrow down the intra prediction direction candidates based on the intra prediction direction obtained in the encoded picture preceding in the encoding order.

18. The intra prediction apparatus according to claim 17, wherein an intra prediction direction of a macroblock to be encoded and a macroblock of a spatially identical position and a position including the surroundings of that spatially identical position is used as the intra prediction direction.

19. The intra prediction apparatus according to claim 13, wherein the result is an adjacent pixel difference of the original picture or the encoded picture preceding in the encoding order; and said candidate narrowing-down unit is configured to narrow down the intra prediction direction candidates based on the adjacent pixel difference.

20. The intra prediction apparatus according to claim 1, wherein said candidate narrowing-down unit is configured to adjust an amount of the narrowing down of the intra prediction direction candidates based on a processing capacity of the intra prediction apparatus.

21. An intra prediction method comprising steps of:
acquiring information identifying a display form of a plurality of pixels that makes up input video data, the display form being used for displaying the plurality of pixels as a picture;

narrowing down, from a plurality of intra prediction directions, intra prediction direction candidates based on the acquired information, intra prediction direction candidates being applied to a block composed of the plurality of pixels; and executing via a computer intra prediction on the block using the intra prediction direction candidates narrowed down by said narrowing-down step, wherein a combination of the intra prediction direction candidates narrowed down by said candidate narrowing-down step changes depending on horizontal and vertical distribution of the plurality of pixels as indicated by the information acquired in the acquiring step, (a) a majority of the intra prediction directions included in the narrowed-down intra prediction direction candidates each have more vertically oriented components than horizontally oriented components when a comparison between the vertical distribution and the horizontal distribution of the plurality of pixels shows that density of the vertical distribution is higher than density of the horizontal distribution, and (b) a majority of the intra prediction directions included in the narrowed-down intra prediction direction candidates each have more horizontally oriented components than vertically oriented components when a comparison between the vertical distribution and the horizontal distribution of the plurality of pixels shows that density of the horizontal distribution is higher than density of the vertical distribution.

22. The intra prediction method according to claim 21, wherein an amount of said narrowing down of the intra prediction direction candidates is adjusted based on a processing capacity of an intra prediction apparatus configured to perform said intra prediction method.

23. A computer program embodied on a non-transitory computer readable medium for causing a computer to execute intra prediction, said computer program comprising:

computer executable program code configured to cause the computer to acquire information identifying a display form of a plurality of pixels that makes up input video data, the display form being used for displaying the plurality of pixels as a picture;

computer executable program code configured to cause the computer to narrow down, from a plurality of intra prediction directions, intra prediction direction candidates based on the acquired information, the intra prediction direction candidates being applied to a block composed of the plurality of pixels; and computer executable program code configured to cause the computer to execute intra prediction on the block using the narrowed down intra prediction direction candidates, wherein a combination of the narrowed down intra prediction direction candidates changes depending on horizontal and vertical distribution of the plurality of pixels as indicated by the acquired information, (a) a majority of the intra prediction directions included in the narrowed-down intra prediction direction candidates each have more vertically oriented components than horizontally oriented components when a comparison between the vertical distribution and the horizontal distribution of the plurality of pixels shows that density of the vertical distribution is higher than density of the horizontal distribution, and (b) a majority of the intra prediction directions included in the narrowed-down intra prediction direction candidates each have more horizontally oriented components than vertically oriented components when a comparison between the vertical distribution and the horizontal distribution of the plurality of pixels shows that density of the horizontal distribution is higher than density of the vertical distribution.

24. The computer program according to claim 23, wherein an amount of the narrowing down of the intra prediction direction candidates is adjusted based on a processing capacity of the computer.

\* \* \* \* \*